Feb. 26, 1957 L. F. CRABTREE 2,783,304

TELEPHONE DICTATING AND TRANSCRIBING SYSTEM

Filed Sept. 15, 1955 13 Sheets-Sheet 1

INVENTOR.
LEONARD F. CRABTREE

BY [signature]

ATTY.

Feb. 26, 1957 L. F. CRABTREE 2,783,304

TELEPHONE DICTATING AND TRANSCRIBING SYSTEM

Filed Sept. 15, 1955 13 Sheets-Sheet 2

INVENTOR.
LEONARD F. CRABTREE
BY Wm. Walter Owen
ATTY.

INVENTOR.
LEONARD F. CRABTREE
BY [signature]
ATTY.

TELEPHONE DICTATING AND TRANSCRIBING SYSTEM

Filed Sept. 15, 1955 13 Sheets-Sheet 4

INVENTOR.
LEONARD F. CRABTREE
BY [signature]
ATTY.

Feb. 26, 1957 L. F. CRABTREE 2,783,304

TELEPHONE DICTATING AND TRANSCRIBING SYSTEM

Filed Sept. 15, 1955 13 Sheets-Sheet 5

INVENTOR.
LEONARD F. CRABTREE
BY Wm. Walter Owen
ATTY.

Feb. 26, 1957 L. F. CRABTREE 2,783,304

TELEPHONE DICTATING AND TRANSCRIBING SYSTEM

Filed Sept. 15, 1955 13 Sheets-Sheet 6

INVENTOR.
LEONARD F. CRABTREE
BY Wm. Walter Owen
ATTY.

TELEPHONE DICTATING AND TRANSCRIBING SYSTEM

Filed Sept. 15, 1955

INVENTOR.
LEONARD F. CRABTREE
BY Wm Walter Owen.
ATTY.

INVENTOR.
LEONARD F. CRABTREE
BY Wm. Walter Owen
ATTY.

Feb. 26, 1957 L. F. CRABTREE 2,783,304

TELEPHONE DICTATING AND TRANSCRIBING SYSTEM

Filed Sept. 15, 1955 13 Sheets-Sheet 9

INVENTOR.
LEONARD F. CRABTREE
BY Wm. Walter Owen
ATTY.

TELEPHONE DICTATING AND TRANSCRIBING SYSTEM

INVENTOR.
LEONARD F. CRABTREE
BY Wm. Walter Owen
ATTY.

TELEPHONE DICTATING AND TRANSCRIBING SYSTEM

Filed Sept. 15, 1955

INVENTOR.
LEONARD F. CRABTREE
BY Wm. Walter Owen
ATTY.

Feb. 26, 1957 L. F. CRABTREE 2,783,304

TELEPHONE DICTATING AND TRANSCRIBING SYSTEM

Filed Sept. 15, 1955 13 Sheets-Sheet 12

INVENTOR.
LEONARD F. CRABTREE

BY Wm. Walter Owen,

ATTY.

INVENTOR.
LEONARD F. CRABTREE
BY Wm. Walter Owen.
ATTY.

United States Patent Office
2,783,304
Patented Feb. 26, 1957

2,783,304

TELEPHONE DICTATING AND TRANSCRIBING SYSTEM

Leonard F. Crabtree, Downers Grove, Ill., assignor to Automatic Electric Laboratories, Inc., Chicago, Ill., a corporation of Delaware Application September 15, 1955, Serial No. 534,514
30 Claims. (Cl. 179—6)

The present invention relates in general to telephone dictating or recording systems, wherein remote recording machines are controlled and operated over telephone lines, for the purpose of recording speech on said machines over said telephone lines, for subsequent reproduction as required. Systems of this general type may be found in Patents 1,993,870 issued to A. H. Belliveau on March 12, 1935, 2,224,244 issued to R. M. Hicks on December 10, 1940, and 2,472,435 issued to E. S. Peterson on June 7, 1949.

In the dictating system of Patent 1,993,870 a plurality of dictators' telephone stations are given access to a plurality of remote dictating machines, an idle dictating machine being selected automatically in response to the lifting of the telephone handset. In this system, the speech is recorded on a wax cylinder or like device, which is removed and replaced when full, by an attendant. The full cylinders are then assigned to typists for transcription.

In the stock quotation system of Patent 2,224,244 a plurality of quotation clerks' telephone stations are given access to different groups of tape recorders, a separate recorder being provided for each stock. The clerks select the different recorders by means of select keys, whereupon the recorder causes the tape to make one revolution and stop. During this revolution, the machine erases the old quotation and records the new one, as spoken by the stock clerk. Subscribers to the system may then receive these quotations from the recorders over the regular telephone system, by simply dialing a special number assigned to the particular stock involved.

In the complaint-reporting system of Patent 2,472,435, the subscribers of a semi-automatic telephone exchange supervised remotely from a neighboring exchange, are given telephonic access to a wire recorder in the local exchange, in response to dialing a special number. By then speaking their message into their telephone transmitter, they cause their complaint to be recorded. An operator or attendant at the neighboring exchange also has access to this recorder by dialing a special number. By dialing further digits, this operator may then listen to the recorded complaints, taking notes as necessary. She then causes the recorder to rewind, for recording further complaints, the old being erased as the new are recorded.

The main object of the present invention is the provision of a dictating and transcribing system in which a plurality of dictators' telephone stations and a plurality of transcribers' telephone stations are associated with a plurality of recording machines in such a way that an idle one of said recorders may be seized by any one of said dictator stations for the purpose of recording a message on such recorder, and an idle one of said transcriber stations is then seized and signalled by said recorder for the purpose of reproducing such message at such transcriber station, for transcription or otherwise as may be required.

Another object of the invention is the provision of a system of this type in which said dictator stations and said transcriber stations are arranged in corresponding classes, with means for causing the recorders, which are accessible to all classes of dictators, to seize transcriber stations of the class corresponding to the class of the dictator station making the recording.

A feature of the invention is the provision of means whereby certain of said dictator stations can change from one class to a different class, by the simple operation of a key at such station, with means whereby the recorder involved in the call will automatically select a transcriber station of the proper class, according to the operation or non-operation of said key.

Another feature of the invention is the provision of a plurality of transcriber stations of each class, with means for causing said recorders to seize an idle station of the proper class automatically.

Another feature is the provision of means for busying said transcriber stations when defective or not manned, with means operated in response to the operation of said busying means at all transcriber stations of a class for causing further calls of that class to seize a transcriber station of a different class.

A further feature is the provision of means for giving lamp signals to the selected transcriber station identifying the source of the dictation or recording under all conditions.

Other objects and features of the invention will be made apparent by the following description and claims when considered with reference to the appended drawings, comprising Figures 1 to 14 inclusive. These drawings show, in circuit diagram form, a particular embodiment of the invention, drawn in sufficient detail to enable the invention to be readily described and understood.

Figures 2, 2A, 14:
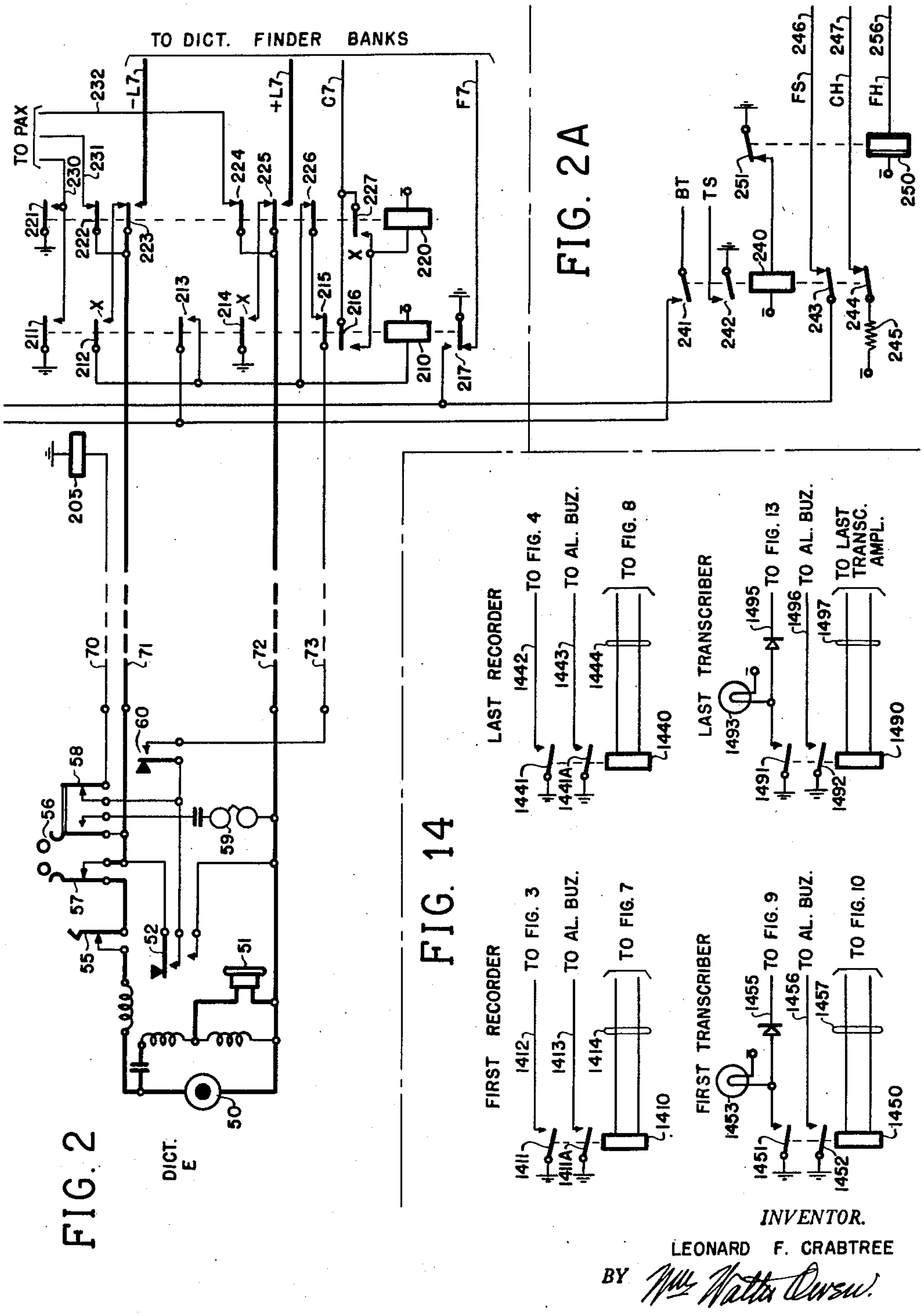
Fig. 2 shows another dictator's telephone station, another line, and a single associated line circuit.
Fig. 2A shows a pair of all-recorders-busy relays, which are common to the system.

Fig. 14, shown with Figs. 2 and 2A, represents a group of amplifier alarm relays.

Figures 1, 15:
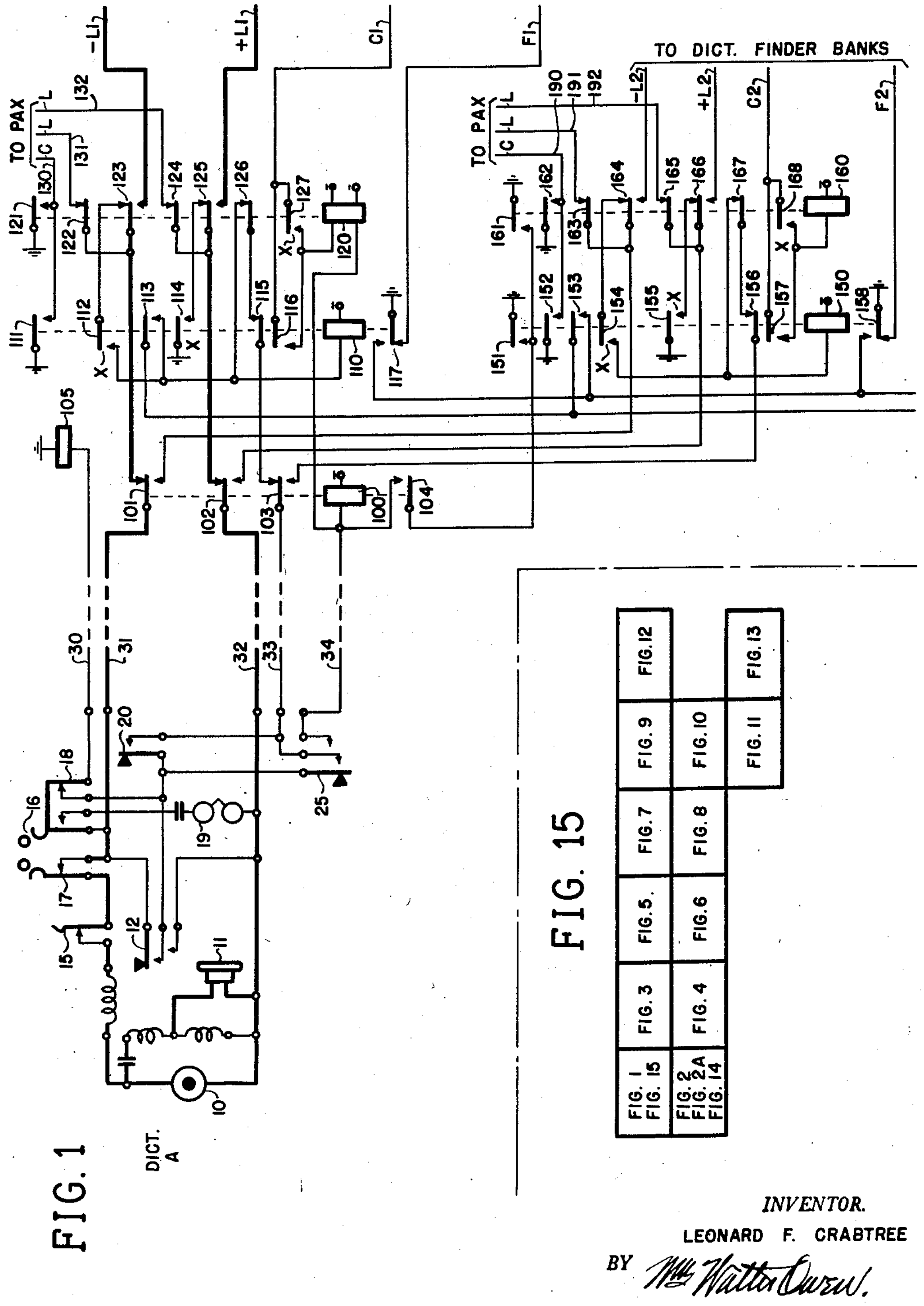
Fig. 1 shows a dictator's telephone station, a line, and two associated line circuits.

Fig. 15 shown with Fig. 1, shows how the figures of the drawings are related to one another.

With further reference to the drawings, the dictator's telephone instrument shown at the left in Fig. 1 is provided with the usual handset containing a transmitter 10, a receiver 11, and a push button 12 in the handle. A dial 15, a cradle switch 16, a ringer 19 and an induction coil are also shown, as well as two control keys 20 and 25. Five wires connect this station with the line equipment shown at the right.

The dictator's telephone instrument shown in Fig. 2 is similar to the foregoing, except that it has only one control key, corresponding to key 20 of Fig. 1, and is connected to the associated line equipment by only four wires. The difference is caused by the fact that the first station is connected to two line circuits, and the latter to only one.

The line circuits are also slightly different but are each provided with a line relay such as 110 or 150, and a cutoff relay such as 120 or 160. The first line circuit in Fig. 1 has also an additional relay 100 for connecting up the second line circuit when required. The capacity of the system will vary with the capacity of the finder switches used. That of the present system is obviously ten line circuits and ten dictator lines. Actually, the illustrated embodiment assumes only five dictator lines and seven line circuits in use. The first two dictator lines are each assumed to be connected to two line circuits, and the last three to single line circuits. Only the first and last of these dictator lines however, are shown in the drawings. Each line circuit is assumed to provide access to a private automatic telephone exchange or PAX, as well as to the dictating circuits, as indicated by the connections marked "To PAX" at the right of Figs. 1 and 2.

The all-recorders-busy relays 240 and 250 in Fig. 2A are normally held operated from the line finder circuits over wire 256, and release only during such times as all recorders are busy.

Figure 3:
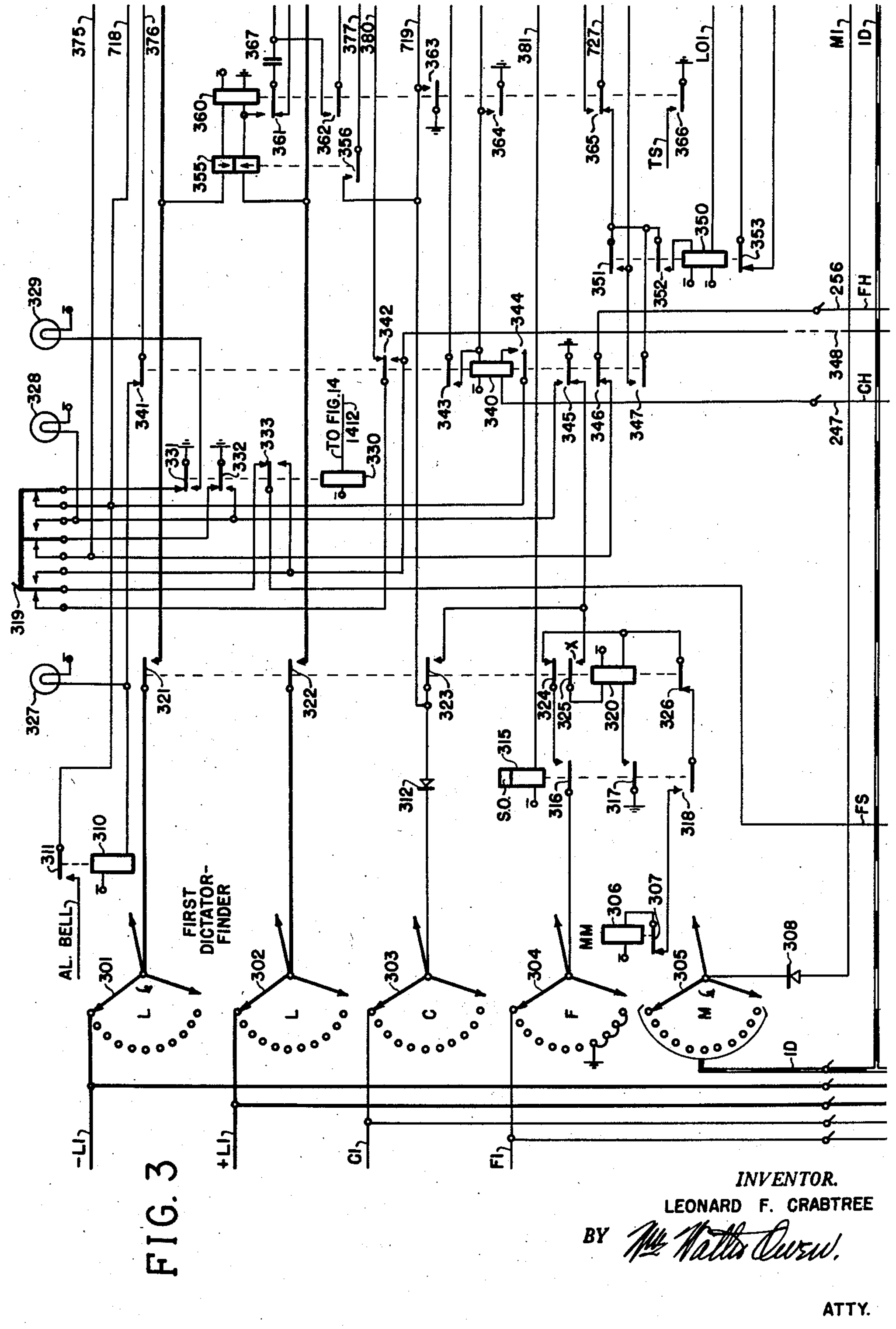
Figs. 3 and 4 represent corresponding first portions of two separate linefinder links associated with the dictator line circuits.
Figure 5:
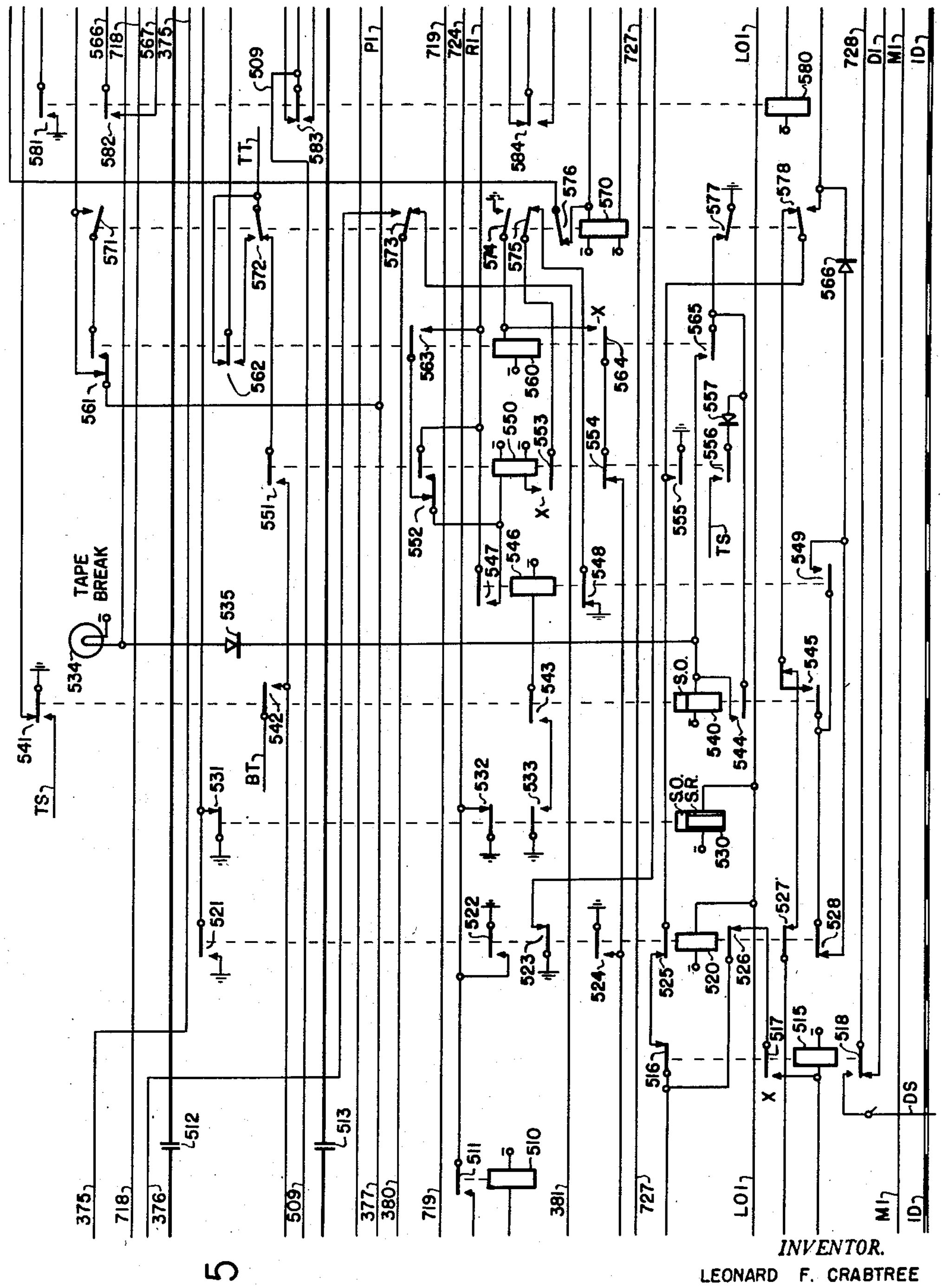
Figs. 5 and 6 represent corresponding second portions of the same two linefinder links of Figs. 3 and 4.
Figure 7:
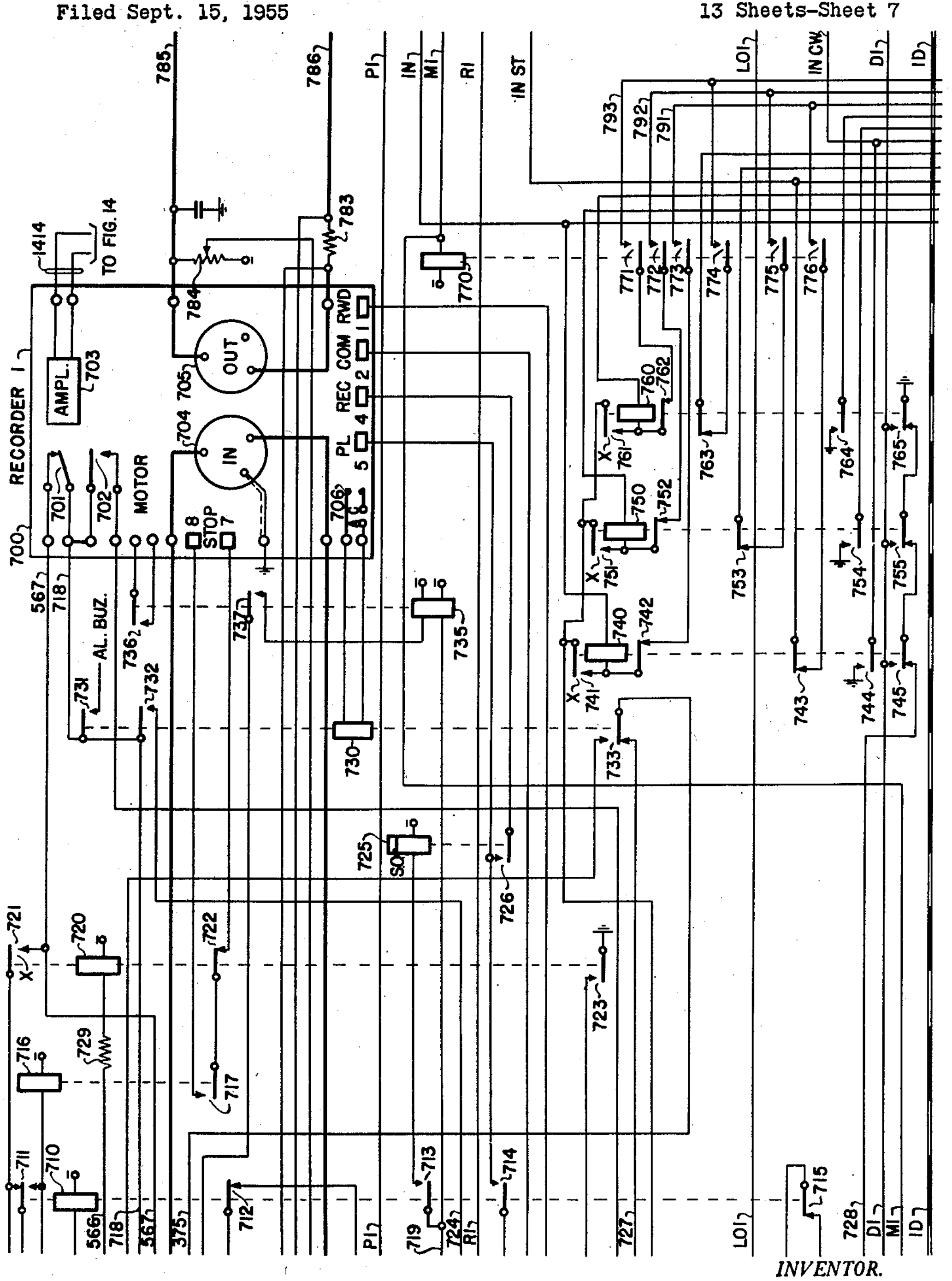
Figs. 7 and 8 represent corresponding third portions of the two linefinder links of Figs. 3 and 4, and show terminal diagrams of two of the tape recorders individually associated with the linefinder links.

The dictator line finder and control circuit for the first recorder, as shown in Figs. 3, 5 and 7, consists of an 11-point, five-level rotary finder switch shown at the left in Fig. 3, plus 28 relays and a busying key 319. A number of signal lamps are also shown, whose location may be as desired. A partial terminal diagram of the associated first recorder is shown at the upper right in Fig. 7, inside the rectangle 700. Various types of recorders might be used without affecting the invention, but the drawings assume the use of an Ampex Model 350 Magnetic Tape Recorder, as manufactured by the Ampex Electric Corporation of Redwood City, California. A total of seven such recorders and seven associated finder and control circuits is assumed for this disclosure.

Figure 4:
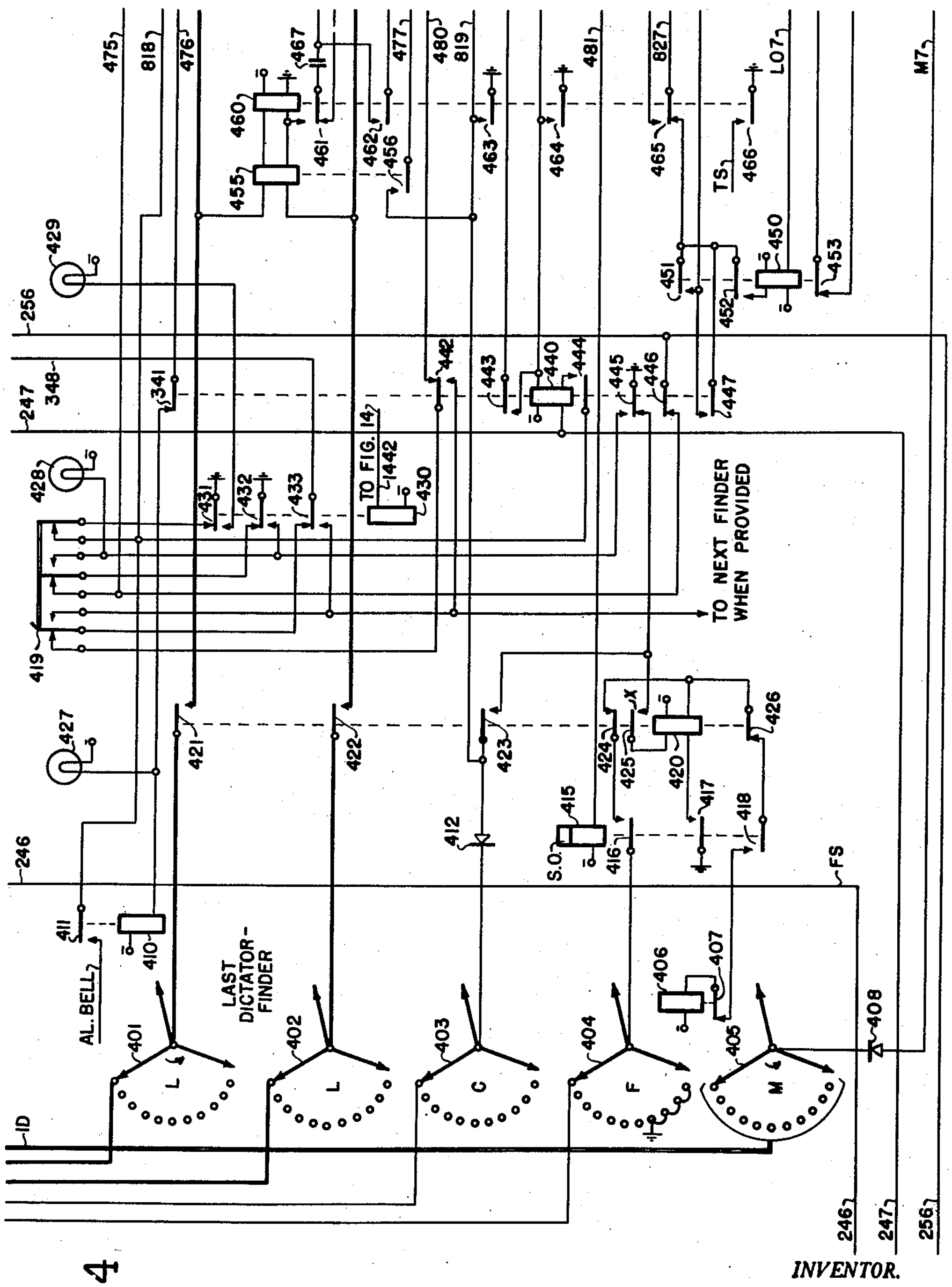
Figure 6:
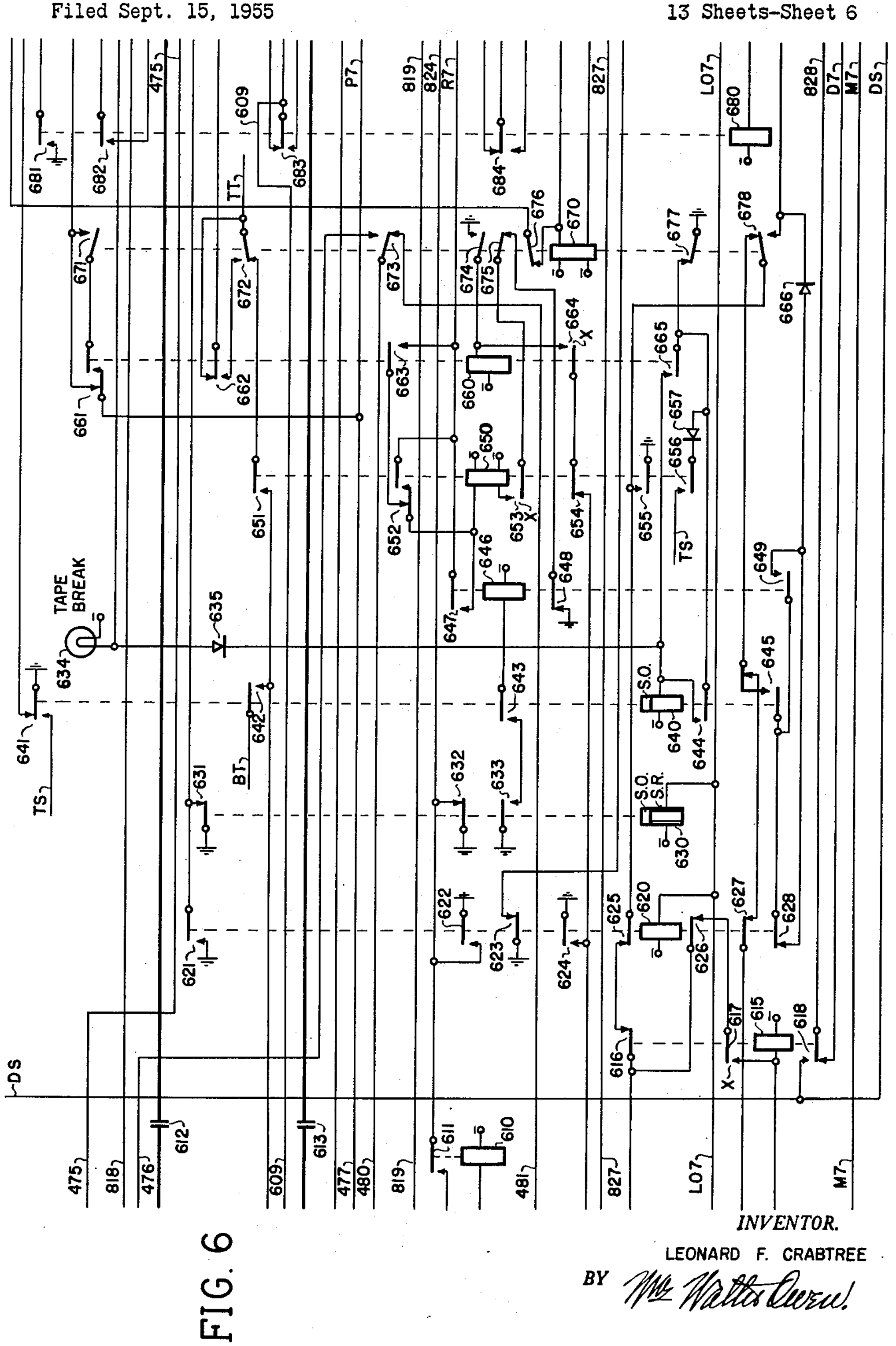
Figure 8:
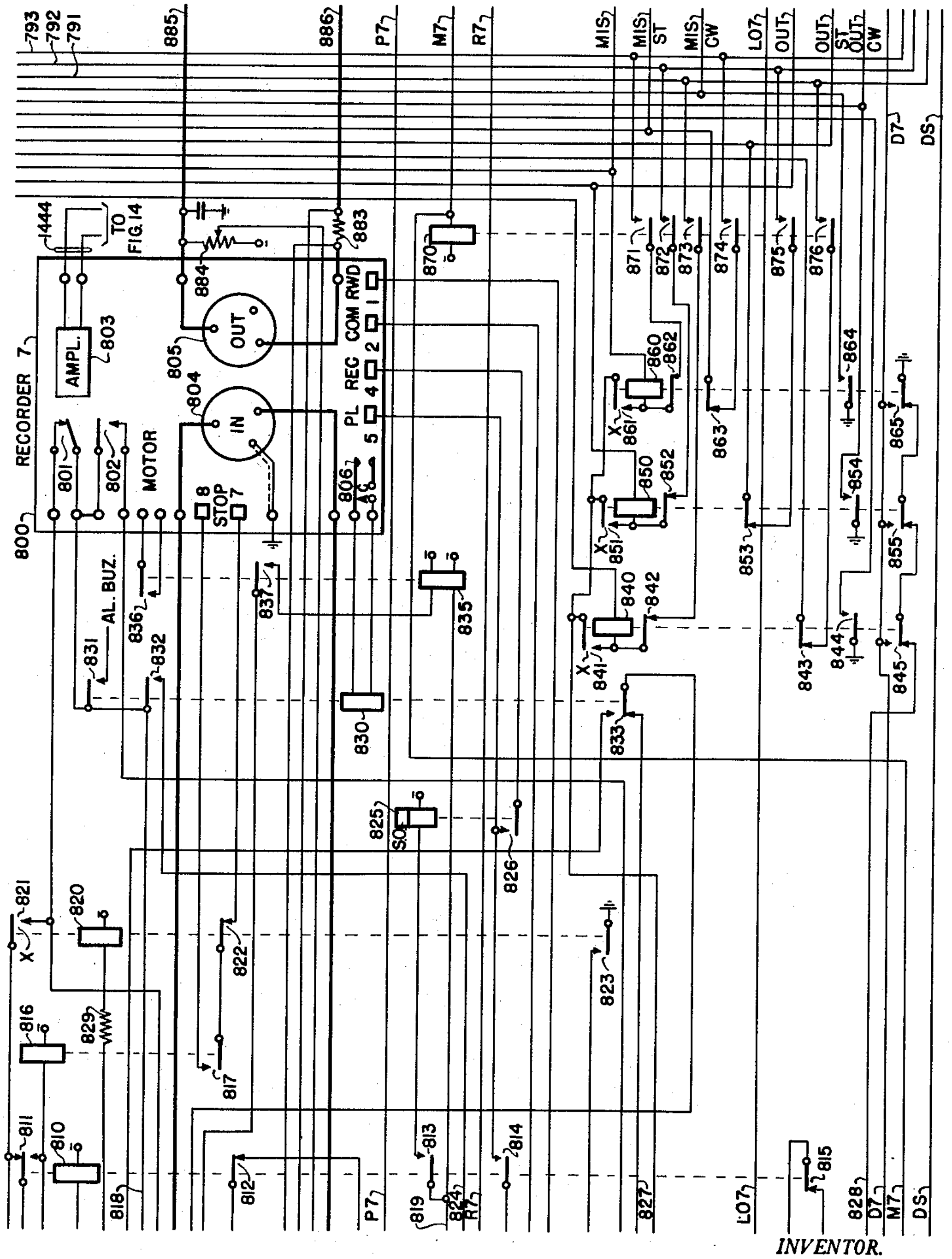

Figs. 4, 6 and 8 show a dictator line finder and control circuit assumed to be associated with the last recorder. This circuit is similar to that of Figs. 3, 5 and 7, and shows the various interconnections between finders. It will be understood that the various dictator line circuits are connected to corresponding contacts in the banks of all of the line finder switches, as indicated for the first line circuit. Upon the initiation of a call to the recording equipment one of these finder switches will find the calling line and connect it to the associated recorder, which is then marked busy to the other dictator stations.

Figure 9:
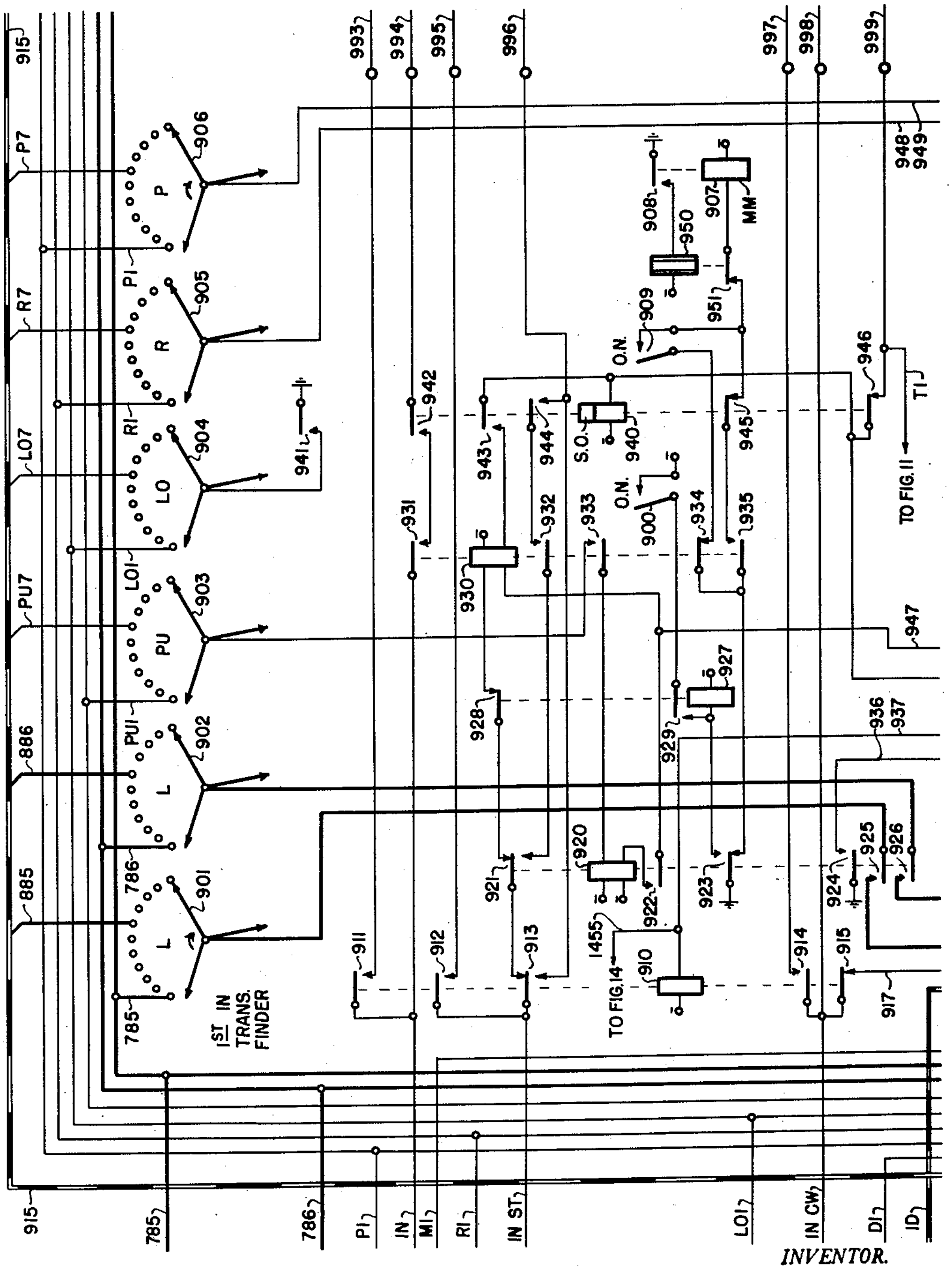
Fig. 9 shows one of the transcriber finder circuits.
Figure 12:
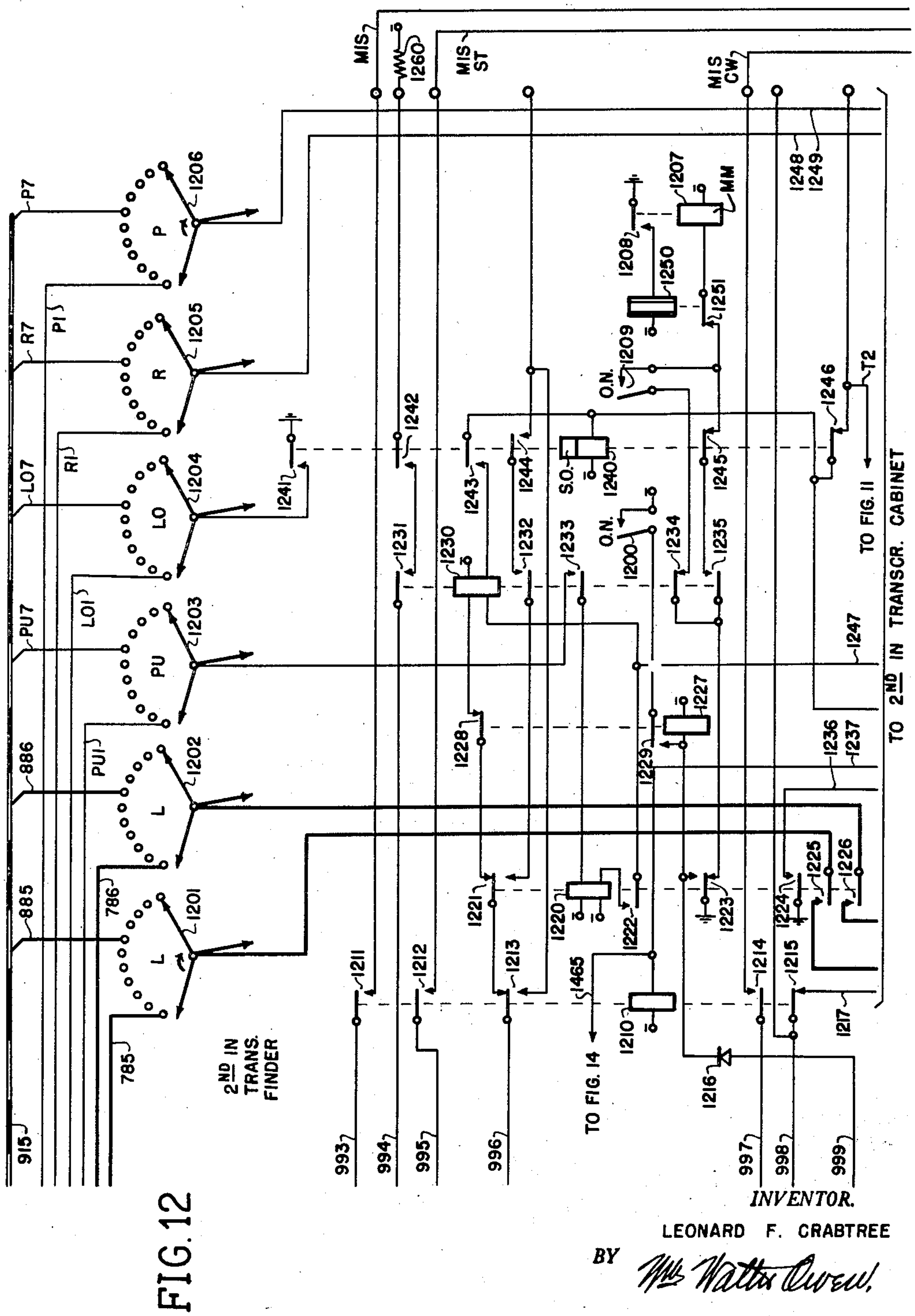
Figs. 12 and 13 represent other transcriber finder circuits.
Figure 13:
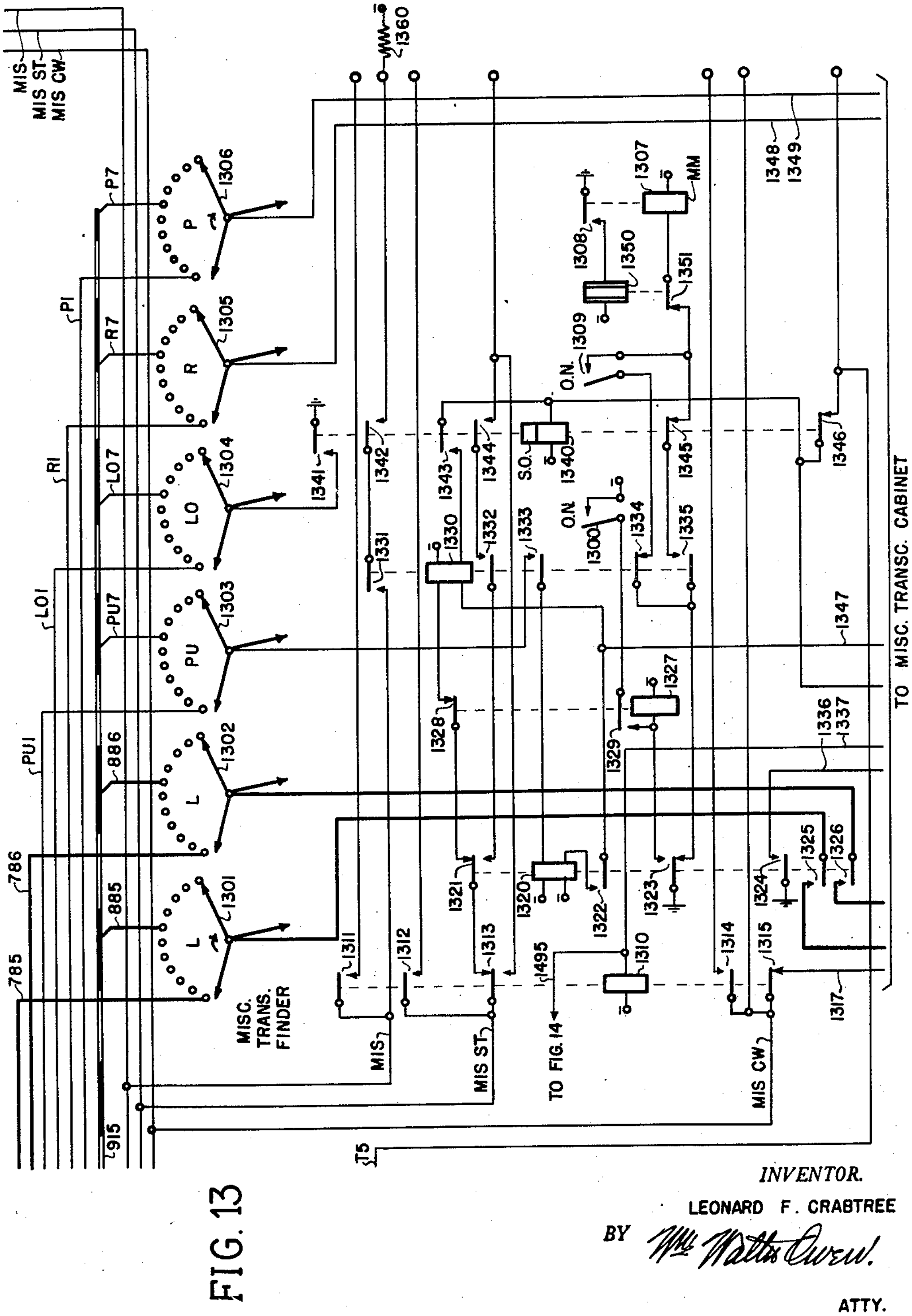

The transcriber finder circuits of Figs. 9, 12 and 13, which are individual to the transcriber stations, each consist of an 11-point six-level rotary finder switch and six relays. Upon the completion of a recording, one of these switches, which are all similar except for the interconnections, will find the recorder involved, and connect it to the transcriber station associated with this particular finder switch.

Figure 10:
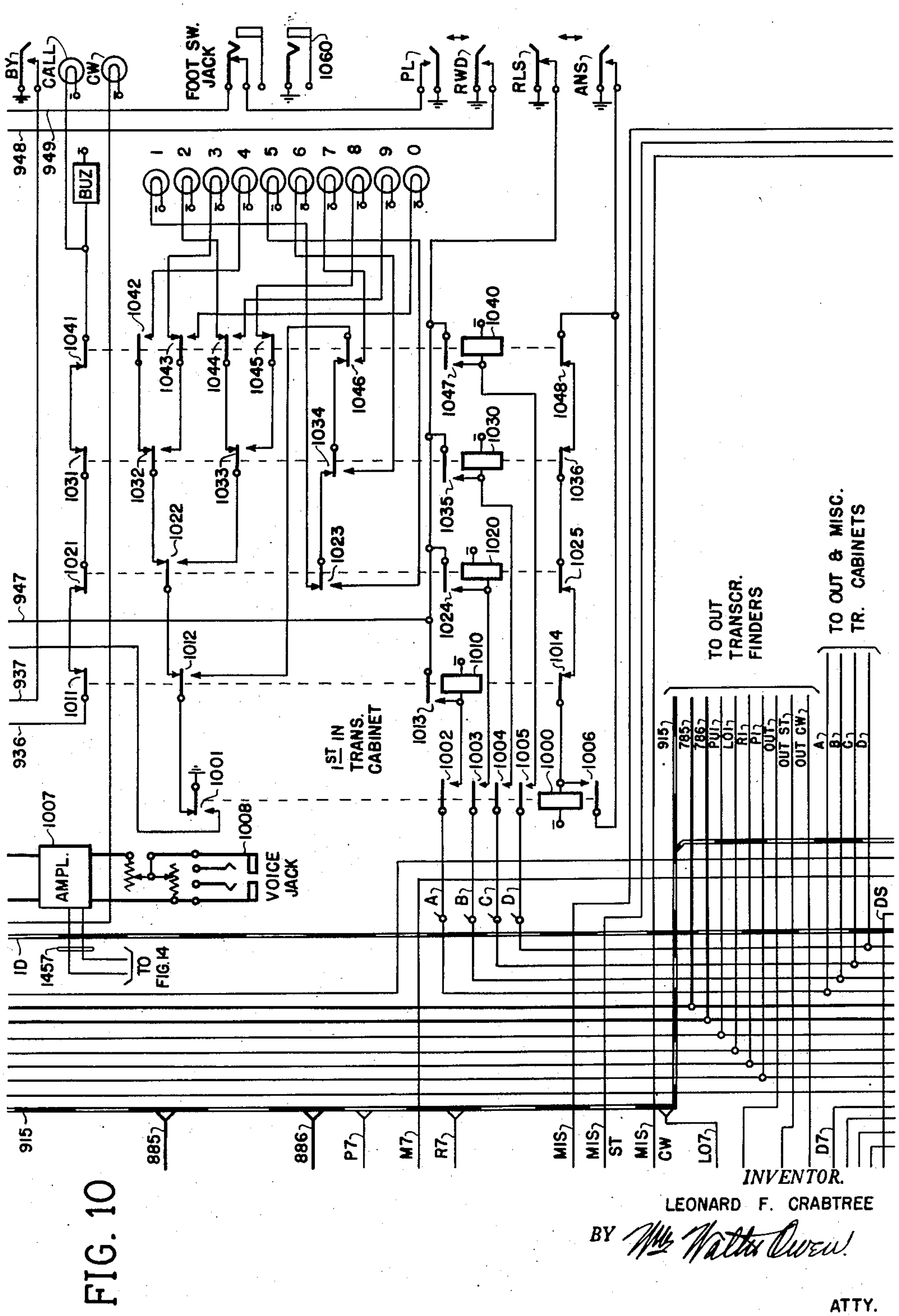
Fig. 10 represents one of the transcriber control cabinets.

The transcriber control cabinet of Fig. 10 which is permanently associated with the finder circuit of Fig. 9, consists of five relays, a bank of ten identity lamps, a call lamp, a call waiting lamp, five control keys, and a pair of jacks. A telephone headset not shown (or the equivalent), may be plugged into the voice jack 1008 shown at the left, and a foot switch not shown, for controlling the reproducing operation in place of the play key PL, may be plugged into the foot switch jack 1060 seen at the right. An amplifier 1007 is also shown at the upper left, connected into the output speech conductors leading to the voice jack. This is in addition to the regular amplifier included in each recorder.

A similar control cabinet is assumed to be similarly associated with the other transcriber finders, of which there are assumed to be five in all in the present instance. These five transcriber finders are divided into three groups, designated as "in," "out," and "miscellaneous." The two finders shown in Figs. 9 and 12 as connected in tandem belong to the "in" group. The "out" group consists of two similar finders similarly connected. These latter are not shown in the drawings, but the incoming connections thereto are indicated in the lower part of Fig. 10. The "miscellaneous" group comprises a single finder only, shown in Fig. 13. The dictators are divided into corresponding groups, and the circuits are so arranged that a recording by an "in" dictator will normally be handled by an "in" transcriber, a recording by an "out" dictator by an "out" transcriber, and a recording by a "misc." dictator by a "misc." transcriber. Overflow arrangements are also provided whereby an "in" or "out" recording may also be handled by the "misc." transcriber, should both transcribers of the proper group be absent or off duty.

Figure 11:
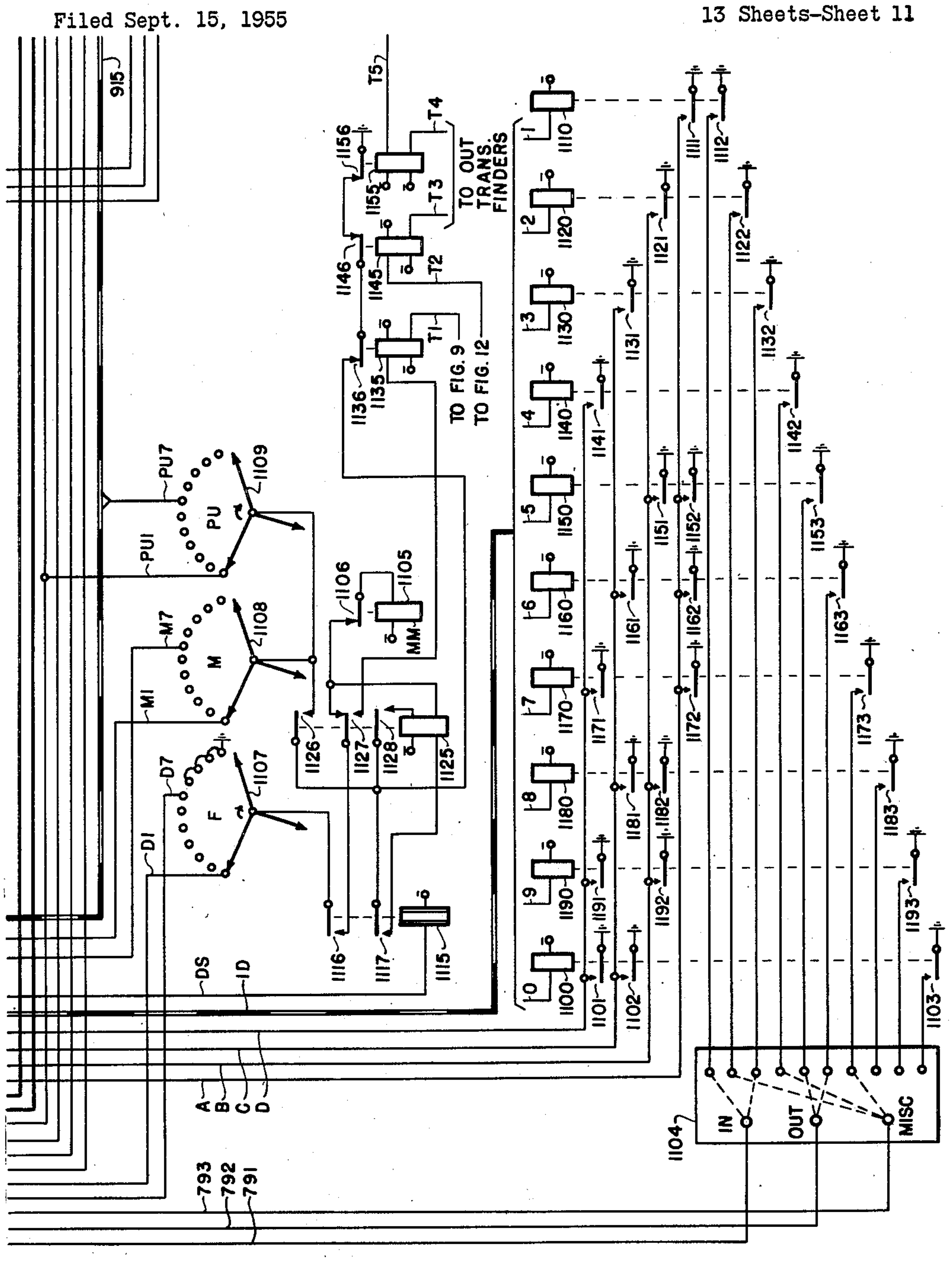
Fig. 11 shows the transcribers' distributor and identity circuit, which is also common to the system.

The transcriber distributor and identity circuit of Fig. 11 consists of an 11-point, three-level rotary finder switch and 15 relays, plus a cross-connecting terminal block 1104. This circuit, which is common to the system, comes into play upon the completion of a recording. It then proceeds to find the recorder involved, identifies the dictator or dictator line circuit, determines the class of the call, and directs the call to the proper transcriber group. Any line circuit may be marked as "in," "out" or "misc." by making the necessary cross-connection on the terminal block 1104.

The alarm circuit of Fig. 14 represents two groups of alarm relays. The upper two relays 1410 and 1440 correspond to the first and last of a group of seven such relays connected to the plate supply circuits of the recorder amplifiers. As long as plate voltage is maintained these relays remain energized, as shown. If this plate voltage fails however, the corresponding alarm relay restores and operates an alarm relay in the associated line finder circuit, which causes this finder to be marked busy to all calls. Audible and visual alarm signals are also operated.

The lower two alarm relays 1450 and 1490 represent the first and last of a group of five such relays connected to the plate supply circuits of the transcriber amplifiers. If the plate voltage fails, in one of these amplifiers, the corresponding alarm relay will restore, and will mark the corresponding transcriber finder circuit busy to all calls, while appropriate alarm signals are again operated.

The description of the equipment, together with its general arrangement and the general method of operation having been completed, a detailed description of the circuit operation will now be given, in order to provide a complete understanding of the invention.

*Telephone calls*

Let it first be assumed that dictator A in Fig. 1 desires to make a telephone call to another station connected to the PAX, such for example, as the dictator station E of Fig. 2.

Upon removal of the handset at station A, the cradle switch 16 assumes the position shown, with the outside springs 17 and 18 closed, and the center springs opened, to disconnect the ringer 19. A loop circuit is now closed to the PAX as follows: transmitter 10, impulsing contacts of dial 15 and contacts 17 of the cradle switch, line wires 31 and 32, break contacts 101, 102, 122, 124, and wires 131, 132 to ground and battery in the regular telephone line circuit corresponding to station A in the PAX, not shown. This PAX line circuit thereupon marks the calling line busy and seizes an impulse-responsive switch in known manner. This switch then returns dial tone, whereupon dictator A dials the directory number of dictator E. The PAX equipment in response to the pulses, selects and rings the line of dictator E, and marks it busy to other calls. The ringing current passes over wires 231, 232, through contacts 222, 224, line wires 71, 72, ringer 59 and the associated condenser, and the middle contacts of cradle switch 56, which are normally closed with the handset in place. When dictator E in response to the ringing removes the handset, the cradle switch disconnects the ringer, and closes its outer contacts 57 and 58. The closure of contacts 57 causes the connector switch at the PAX to disconnect the ringing current and complete a speech connection between the two lines. Any other station connected to the PAX may be called from any dictator station in similar manner, and may also call any dictator station.

*In dictation call*

Let it now be assumed that dictator A wishes to make a normal dictation call. To do this he first removes the telephone handset as before. Again the PAX line circuit not shown seizes a switch in the PAX which returns dial tone, and marks this line busy to other calls. Upon hearing the dial tone, dictator A operates key 20 momentarily. Cradle switch 16 being now in the position shown in the drawing, the closure of key 20 causes the operation of the illustrated line relay 110 over the following circuit: positive battery through impedance coil 105, line wire 30, cradle switch contacts 18, key 20, line wire 33, contacts 103, 115, 126, and the winding of relay 110 to negative battery. Relay 110 thereupon, at its preliminary make contacts 112, 114 closes the following loop circuit for itself: positive battery through contacts 114, 125, 102, speech wire 32, transmitter 10, dial contacts 15, cradle switch contacts 17, speech wire 31, contacts 101, 123, 112 and relay 110 to negative battery. Relay 110 also, at contacts 111 extends an additional busy marking to the PAX over test wire 130 preparatory to the operation of cutoff relay 120, at contacts 113 prepares a busy tone circuit of no interest at this time, at contacts 115 opens the original circuit from key 20, and at contacts 116 prepares a circuit to cutoff relay 120. Relay 110 further, at break contacts 117 removes a positive battery marking from the first bank contact in the F level of all of the dictator finder switches, and at make contacts 117 closes the finder start circuit.

Assuming the first finder and the associated first recorder to be free, this finder start circuit will be extended to start relay 315 of this finder as follows: positive battery through contacts 117 to Fig. 2A, contacts 243, wire 246, break contacts 333, left break contacts of busy key 319, contacts 342, wire 380, contacts 573, wire 381, and relay 315 to negative battery. Relay 315 operates over this circuit after a slight delay, due to its being made slow to operate, as by the use of a copper slug over the armature end of its core, and closes its contacts. Should the finder wiper 304 be already standing on the first bank contact of the F level as illustrated, there will be no shunting potential on the wiper, and finder stop relay 320 will operate, from positive battery through contacts 317, lower winding of relay 320, contacts 326, 318, 307, and the winding of motor magnet 306 to negative battery. Magnet 306 will not operate in this circuit, due to the resistance of relay 320 being in series with it.

Should stop wiper 304 be standing on some other bank contact however, positive battery from break contacts of the associated line relay, corresponding to contacts 117, will pass over wiper 304 and through contacts 316, 324, 326, 318, and 307 to motor-magnet 306. Motor-magnet 306 accordingly operates in this circuit, which shunts out the lower winding of stop relay 320. Relay 320 therefore remains normal. Motor-magnet 306 prepares the advance of the wipers, and at contacts 307 opens its own circuit. Magnet 306 accordingly releases and advances the wipers one step in known manner. If wiper 304 finds positive on the next contact, magnet 306 will re-operate quickly, and the action will be repeated, and the wipers will advance around the bank at high speed, until it fails to find a positive battery marking. When this occurs, as on the first bank contact for example, motor magnet 306 will not re-operate, but stop relay 320, being no longer shunted, will operate in series with it, in the manner previously explained.

Finder stop relay 320 upon operating, first closes its preliminary make contacts 325 and closes a locking circuit to its upper winding from positive battery at break contacts 345. Relay 320 then, at its contacts 321, 322 prepares the speech circuit, at contacts 324, 326 opens the circuit to the motor magnet, and at contacts 323 closes a circuit to the upper winding of cutoff relay 120, from positive battery through contacts 345, 323, disc rectifier 312, test wiper 303, and the first bank contact, and line relay contacts 116.

Cutoff relay 120 operates in this circuit, and at its preliminary make contacts 127 locks direct to the positive battery from wiper 303. Relay 120 also, at contacts 121 connects another busy marking to the PAX over test wire 130 preparatory to the release of line relay 110, at contacts 122, 124 disconnects the line loop from the PAX, at break contacts 123, 125 releases line relay 110, at make contacts 123, 125 extends the line loop to the recorder, and at contacts 126 opens another point in the original operate circuit of line rleay 110 to prevent its re-operation from key 20.

Upon the extension of the line loop to the recorder, a circuit is completed from positive and negative battery through both windings of the linefinder line relay 360 in series with the two windings of differential relay 355 and thence over contacts 321, 322, speech wipers 301, 302, contacts 123, 125, 101, 102, and wires 31, 32 through the calling telephone. Line relay 360 operates in this circuit, but relay 355 whose windings are energized in opposition to each other, remains in its normal position.

Upon the operation of line relay 360, contacts 361, 362 thereof prepare tone circuits, contacts 363 operate the capstan motor relay 735 over wire 719, and connect a second source of positive battery through test wiper 303 to cutoff relay 120, contacts 364 operate the start-circuit-transfer relay 340 and its lockup relay 510 in parallel in obvious manner, contacts 365 prepare a locking circuit for the forward control relay 560, and contacts 366 connect positive battery to the tone start lead TS.

The tone start lead TS controlled by contacts 366 is assumed to terminate in a tone device not shown, which is common to the system. Its particular structure is immaterial, and its only function, in the present case, is to generate a hum-like busy tone, and a cricket-like tick tone to the wires BT and TT as long as the tone start wire TS is kept energized. The regular tone machine of the PAX could be used if tick tone is provided thereby, but this disclosure assumes a separate device in the form of a small group of relays, one of which acts like a buzzer to furnish the busy tone, while the others operate and release slowly to connect positive and negative battery alternately to the TT wire through an impedance-capacitance network to furnish the tick tone.

Upon the closure of contacts 366 therefore, the tone device starts and passes tick tone back into the dictator's line by way of the tick tone wire TT at the upper right in Fig. 5, through contacts 562, 712, 362, condenser 367, make contacts 361, lower winding of differential relay 355 and to the dictator's telephone and back over the other side of the line. When the dictator hears this signal in the receiver 11, he knows that he has seized a recorder and may proceed with his dictation.

Meanwhile, the operation of relays 340, 510, and 735 has also occurred, as previously stated. Relay 510 upon operating prepares a locking circuit for relay 340, while relay 735 at contacts 737 locks over its upper winding to break contacts 531, and at contacts 736 starts the recorder capstan motor, not shown. The tape remains stationary however, since the capstan clutch has not yet been operated. Transfer relay 340 upon operating, at contacts 341 disconnects the tape off-normal alarm relay 310, at contacts 342 transfers the finder start circuit to the next finder, at contacts 343 locks over its upper winding to positive battery through contacts 511 and 532, and at contacts 344 closes a second locking circuit for itself from positive battery through contacts 331, right break contacts of busy key 319, contacts 344, lower winding of relay 340, and wire 247 to negative battery through the normally closed make contacts 244 and resistor 245 in Fig. 2A. Relay 340 further, at make contacts 345 lights busy lamp 328, at break contacts 345 disconnects its locking battery from stop relay 320, which however is now locked to contacts 323 and 363, at contacts 346 disconnects this linefinder's positive battery marking from wire 256 leading to the all-recorders-busy relay 250, and at contacts 347 prepares a locking circuit for the lockout relay 350. The all-recorders-busy relay 250 remains held from the other relays 340 of the idle finder circuits, and maintains its associated relay 240 also in the operated position. On the other hand, linefinder start relay 315 releases, following the transfer of the start circuit to the next finder at contacts 342, and opens its contacts 316, 317 and 318.

To start the dictation, the dictator first presses the push button 12, which is preferably in the handle of the handset, though it may be elsewhere. Positive battery from impedance coil 105 is thereby connected to both sides of the line loop, and shunts out the lower winding of both the differential relay 355 and the line relay 360. Relay 355 accordingly operates over its upper winding, in series with the upper winding of line relay 360, which remains operated.

Differential relay 355 upon operating, closes a circuit to the forward relay 710 from positive battery through contacts 363, 356, and 561. Relay 710 upon operating, at break contacts 711 releases the tape normal relay 570, which is normally held locked over its upper winding to positive battery through contacts 576, 711 and 541. Relay 710 further, at make contacts 711 closes a circuit to stop relay 716 from the positive battery at contacts 541, at contacts 712 disconnects the tick tone from the dictator's line, at contacts 713 closes a circuit to record relay 725 from the positive battery on wire 719 from contacts 363, and at contacts 714 closes the remote control "play" circuit of the recorder. Stop relay 716 then operating, at contacts 717 closes the recorder "stop" circuit which connects power to the recorder remote control relays. The recorder play relay not shown, now operates from contacts 714 and 584, and starts the tape moving in a forward direction. Record relay 725 also operates after a short delay due to being made slow to operate, and at contacts 726 closes the remote control circuit to the recorder's record relay not shown, which energizes the record and erase heads following the starting of the tape.

After the tape has moved a short distance from its normal starting position, a silver spot on the tape moves away from a pair of terminals represented by the closed contacts 701 in Fig. 7, and opens the associated circuit. This is without effect at this time.

Meanwhile, the tape normal relay 570, which releases at the same time that stop relay 716 operates, has moved all of its contacts to the de-energized position. Contacts 571 accordingly prepare a new circuit for forward relay 710, contacts 572 prepare a new tick tone circuit, contacts 574 operate forward control relay 560, contacts 576 further open the locking circuit of relay 570, contacts 577 disable the primary circuits of tape alarm relay 540, and contacts 578 prepare a circuit to the rewind relay 580. Contacts 573 and 575 are of no special significance at this time.

Forward control relay 560 upon operating, at its make-before-break contacts 561 opens the original circuit to the forward relay 710, and substitutes a new circuit through the now closed contacts 571, from the original positive battery through contacts 356 and 363. Relay 560 also, at contacts 562 closes another point in the new tick tone circuit, now open at contacts 712 of the forward relay, at contacts 563 prepares a circuit for the rewind control relay 550, at contacts 564 locks to positive battery through contacts 554, 365, 733 and 332, and at contacts 565 closes a point in the primary circuit of tape alarm relay 540, which circuit is now open at contacts 577 as noted in the preceding paragraph.

The cessation of tick tone in the dictator's receiver 11 serves as notice to the dictator that he may now proceed with his dictation, which he does by speaking into his transmitter 10. Voice currents thereupon pass out over the dictator line to the line finder switch line wipers 301 and 302, and thence through contacts 321, 322 and condensers 512, 513 to the input jack 704 of the recorder amplifier 703, and through this amplifier to the recorder head not shown, which records the speech on the moving tape in known manner, while the erase head not shown, at the same time erases the previous recording. In Figs. 1, 3, 5 and 7 we now have the relays 120, 320, 340, 355, 360, 510, 560, 710, 716, 725, and 735 in the operated position.

Should the dictator at any time wish to pause in his recording momentarily, he has only to release push button 12. This immediately removes the shunt from the lower winding of relays 355 and 360. The line relay 360 remains operated, but differential relay 355, with equal and opposing current flowing once more in its windings, releases. The release of relay 355 causes the release of forward relay 710, which in turn releases the stop and record relays 716 and 725. This opens the recorder stop, play, and record circuits, and the tape stops advancing. The forward relay 710 at the same time puts tick tone back on the calling line, through contacts 572, 562, 712, 362, and 361.

When the dictator again operates push button 12 to resume dictation, differential relay 355 again operates as before, and re-operates forward relay 710. The circuit for relay 710, from contacts 363 and 356 now passes through make contacts 561 and break contacts 571 instead of through break contacts 561 as before. Relay 710 again disconnects the tick tone at contacts 712, at contacts 714 re-closes the recorder play circuit, and at contacts 713 re-energizes record relay 725, which after the usual slight delay recloses the recorder record circuit. Upon removal of the tick tone, the dictator resumes dictation.

*Start of transcription*

Upon completion of the dictation, the dictator replaces the handset. Cradle switch 16 thereupon opens its outer contacts 17 and 18, and re-closes its center contacts thereby again putting the ringer 19 in circuit. Contacts 17 at the same time open the direct current loop and cause the release of relays 355 and 360. If the push button 12 has been released first, of course relay 355 will release first, and will release relays 710, 716 and 725 as before, to stop the movement of the tape. Line relay 360 upon releasing, at contacts 363 opens the locking circuits of line cutoff relay 120 and finder stop relay 320, as well as the operate circuit of the capstan motor relay 735. Relay 360 further, at contacts 364 opens the operate circuits for transfer relay 340 and its lockup relay 510, at make contacts 365 opens the locking circuit to forward control relay 560, at break contacts 365 further prepares or completes the circuit to rewind relay 580, depending upon the position of relay 710, and at contacts 366 removes its positive from the tone start lead.

Relays 120 and 320 release quickly, in response to the release of relay 360, but relay 560 is still held from contacts 574, while relays 340 and 510 remain locked in parallel to positive through contacts 343, 511, and 532. Transfer relay 340 is also still locked over its lower winding to contacts 331 and 244. Capstan motor start relay 735 likewise remains operated, due to its still closed locking circuit through contacts 737 and 531. Rewind relay 580 operates, as soon as relays 360 and 710 have released, over the following circuit: positive through contacts 332, middle break contacts of busy key 319, wire 375, contacts 733, wire 727, contacts 365, 347, 516, 525, 578, 715, and the winding of relay 580 to negative.

Rewind relay 580 upon operating, at contacts 581 re-operates stop relay 716, at contacts 582 prepares a circuit to the rewind limit relay 720, and at contacts 583 connects an artificial load into the recorder output circuit, which however, is without significance at this time. Relay 580 also, at contacts 584 disconnects the recorder play and record circuits and energizes the recorder rewind circuit. The recorder rewind motor thereupon proceeds to rewind the tape on the supply spool.

When the tape has been rewound to its starting position, a spot of silver near the end of the tape, represented by the closed contacts 701 at the upper left in the recorder diagram, closes a circuit to the rewind limit relay 720. This circuit extends from negative battery through relay 720, resistor 729, contacts 582, wire 567, contacts 701, wire 718, right break contacts of busy key 319 and break contacts 331 to positive battery. Relay 720 operates quickly in this circuit, and at its preliminary make contacts 721 locks through contacts 711 to positive battery at contacts 541. Relay 720 also, at contacts 722 opens the recorder stop circuit, thereby disabling the recorder rewind circuit and stopping the tape. Relay 720 finally, at contacts 723 re-operates the tape normal relay 570, over its upper winding.

Tape normal relay 570 upon re-operating, at its contacts 576 locks its upper winding to positive battery through break contacts 711 and 541 as before, at contacts 574 releases the forward control relay 560 whose locking circuit is now open at contacts 365 of the finder line relay, and at contacts 578 releases the rewind relay 580 and closes a circuit to the transcriber pickup relay 515.

Rewind relay 580 upon releasing, at its contacts 581 releases the stop relay 716, at contacts 582 releases the rewind limit relay 720, at contacts 583 removes the resistors 783 and 784 from the recorder output circuit, and at contacts 584 disconnects the recorder rewind circuit, and prepares the play and record circuits. At this time, only four relays remain operated in the dictator finder circuit. These are transfer relay 340, transfer lockup relay 510, tape normal relay 570, and motor start relay 735.

The transcriber pickup relay 515 now operates, in response to the re-operation of tape normal relay 570, over the following circuit: positive battery, contacts 332, middle contacts of busy key 319, wire 375, contacts 733, 365, 347, 516, 525, 578, 545, 527, 353, and the winding of relay 515 to negative battery. Relay 515 thereupon, at its preliminary make contacts 517 locks over contacts 526, 347, and 365 to the same positive battery from contacts 733, at contacts 516 opens the original circuit, and at contacts 518 removes the positive marking from contacts 765 from the distributor bank wire D1, and connects it to the distributor start wire DS.

Distributor start relay 1115 accordingly operates, from the positive battery through contacts 765, 755, 745, 518, and over wire DS to negative battery through relay 1115. This relay upon operating, at its contacts 1116, 1117 prepares circuits for motor magnet 1105 and stop relay 1125.

Should the distributor wipers be already standing on the first bank contacts as illustrated, there will be no positive battery from wire D1 on wiper 1107, and stop relay 1125 will operate at once over a local circuit from positive battery through contacts 1156, 1146, 1136, 1117, the lower winding of relay 1125, contacts 1106, and the winding of motor magnet 1105 to negative battery. The motor magnet will not operate in series with relay 1125, and the switch will not advance.

Should the distributor wipers be standing upon some other contacts however at this time, such as contacts seven for example, positive battery through break contacts such as 865, 855, 845 and 618 on wire D7 will close a clear circuit to motor magnet 1105, via wiper 1107, and contacts 1116, 1127, and 1106. This positive battery at the same time shunts the lower winding of stop relay 1125, and prevents the operation of this relay. Motor magnet 1105 does operate however, and opens its contacts 1106. The motor magnet then releases, and advances the wipers one step, at the same time re-closing its interrupter contacts 1106. The motor magnet continues to operate and release in this manner, until test wiper 1107 comes to a contact such as the first in this case, which has had its positive battery removed. Stop relay 1125 will then operate as described in the preceding paragraph, and the motor magnet will not re-operate.

The distributor stop relay 1125 upon operating, at its contacts 1128 locks over its upper winding direct to the positive battery through contacts 1136, 1146, and 1156, at its contacts 1127 disconnects wiper 1107, and at its contacts 1126 connects the same positive battery to the marking and pickup wipers 1108 and 1109. A parallel circuit is now completed over the M1 wire to switching relay 770 and to identity relay 1110 which may be traced as follows: positive battery through contacts 1156, 1146, 1136, 1126, wiper 1108, wire M1, winding of relay 770 to negative battery, and from relay 770 over an extension of wire M1 to Fig. 3, through rectifier 308, through wiper 305 of the dictator finder and the first contact upon which it is standing, through the identity cable ID back across Figs. 3, 5, 7, 9, 10 and 11 to relay 1110 and negative battery.

Switching relay 770 and identity relay 1110 operate in this circuit, and relay 770 at its contacts 771—776 prepares a number of alternative transcriber selecting circuits. Identity relay 1110 at the same time, at its contacts 1111 prepares a circuit over wire A to annunciator control relay 1010 and to the corresponding relay in the other transcriber cabinets, in multiple. Assuming all transcribers to be idle at this time, identity relay 1110 also, at contacts 1112 operates the first in-transcriber-finder start relay 930 over the following circuit: positive battery through contacts 1112, jumper block 1104 to wire 791, contacts 776, 743, start wire IN ST, contacts 913, 921, 928, and the upper winding of relay 930 to battery. A branch of this circuit is also extended through contacts 773 and 742 to one side of the in-call-waiting relay 740, but this is without effect at this time, since there is no circuit for the other side of relay 740 except under certain conditions.

Start relay 930 upon operating, at contacts 931 closes a point in the circuit for call-waiting relay 740, at contacts 932 prepares the extension of the in-start circuit to the second in transcriber finder of Fig. 12, at contacts 933 prepares a circuit for the finder stop relay 920, at contacts 934 disconnects the off-normal contacts 909, and at contacts 935 closes a circuit to motor magnet 907, from positive battery through contacts 923, 935, 945 and 951.

Motor magnet 907 now operates, and at contacts 908 operates interrupter relay 950 which has been made slightly sluggish, as by the use of a copper sleeve over the core. Relay 950 upon operating, at its contacts 951 opens the circuit to motor magnet 907. The motor magnet then releases, and advances the switch wipers 901—906 from their illustrated normal position onto the first contacts of the bank. Motor magnet 907 at the same time, at contacts 908 opens the circuit to interrupter relay 950, while the advance of the wipers causes closure of the off normal contacts 900 and 909. Relay 950 releases after a slight delay and again prepares the motor magnet circuit.

Meanwhile, upon the arrival of pickup wiper 903 on the first bank contact, stop relay 920 operates quickly from the distributor, over the following circuit: positive battery, contacts 1156, 1146, 1136, 1126, pickup wiper 1109, wire PU1 to Fig. 9, pickup wiper 903, contacts 933, and the upper winding of relay 920 to negative battery.

Stop relay 920 upon operating, at contacts 921 opens the circuit to start relay 930 and further prepares the extension of the in start circuit to Fig. 12, and at contacts 922 locks over its lower winding and wire 947 to positive battery at the release key RLS in the transcriber cabinet of Fig. 10. Relay 920 further, at contacts 923 closes a circuit to the hold relay 927 and opens a point in the motor magnet circuit in anticipation of the release of interrupter relay 950. Relay 920 finally, at its contacts 924 closes a circuit through contacts 1011, 1021, 1031 and 1041 to the call buzzer BUZ and the call lamp CALL in Fig. 10, and at its contacts 925 and 926 completes the extension of the recorder output circuit through the finder switch wipers 901 and 902 to the amplifier 1007 in Fig. 10. Hold relay 927 now operates and locks to the closed off normal springs 900, and at contacts 928 further opens the circuit to start relay 930. Start relay 930 releases, in response to the operation of relay 920, and at contacts 933 opens the operate circuit of relay 920. This is without effect however, since relay 920 is now locked to the release key in the transcriber cabinet.

The first in transcriber, in response to the sounding of the call buzzer and the lighting of the call lamp, operates the answer key ANS, thereby closing a circuit through contacts 1043, 1036, 1025, 1014 to annunciator control relay 1000, which operates. Relay 1000 thereupon, at contacts 1006 locks to the operated answer key, at contacts 1002—1005 prepares circuits to the annunciator code relays 1010—1040, at contacts 1002 operates code relay 1010 from positive battery through contacts 1111, at break contacts 1001 temporarily disables the lamp circuits, and at make contacts 1001 closes parallel circuits to relays 940, 1227, and 1135. Answer relay 940, being made slow to operate, actuates its contacts only after a short delay, but the relays 1010, 1227, and 1135 operate immediately.

Code relay 1010 upon operating, at contacts 1011 opens the buzzer and call lamp circuit, at contacts 1012 prepares a circuit to the #1 identity lamp, at contacts 1013 locks to the release key, and at contacts 1014 opens the operate circuit to control relay 1000, which is still locked to the operated answer key. Hold relay 1227, upon operating from the positive battery through contacts 1001, 946, wire 999 and rectifier 1216, closes its contacts 1229 without effect, and at contacts 1228 disconnects start relay 1230.

Cut off relay 1135, upon operating via contacts 1001, 946 and wire T1, at its contacts 1136 removes positive battery from the distributor marking and pickup wipers 1108 and 1109, and from the locking contacts 1128 of stop relay 1125. Relay 1125 releases quickly and at contacts 1126 further opens the circuits through wipers 1108 and 1109. The removal of positive battery from wiper 1109 is without effect, but its removal from wiper 1108 and the wire M1 causes the release of switching relay 770 and the identity relay 1110. These relays accordingly open all of their contacts. This is without direct effect.

Answer relay 940 finally operating, at its break contacts 946 releases relays 1227 and 1135, and at contacts 943 prepares the re-operation of start relay 930, now shunted by positive battery on both sides of its lower winding. Relay 940 further, at its contacts 941 closes a multiple circuit by way of lockout wiper 904 and wire LO1 to the dictator finder relays 530, 520 and 350. Relay 530, being made slow to operate and slow to release, as by the use of a copper sleeve and an armature-end slug over the core, operates only after a short delay, but relays 520 and 350 operate immediately.

Lockout relay 350 upon operating, at make contacts 351 shunts make contacts 347 (to guard against a possible premature release of relay 340), at contacts 352 locks to the positive battery from wire 727 through contacts 365, and at contacts 353 opens the operate circuit to pickup relay 515, now locked operated.

Trip relay 520 upon operating, at contacts 521 and 522 connects additional sources of positive battery to the locking circuits of relays 340 and 735, at contacts 523 disables the locking circuit of the call waiting relays 740, 750 and 760, at contacts 524 prepares a new locking circuit for the forward control relay 560, at contacts 525, 527, 528 opens further points in the operate circuits of the operated pickup relay 515, and the unoperated rewind relay 580, and at contacts 526 opens the locking circuit to 515. Relay 515 thereupon releases quickly.

Trip guard relay 530 upon operating, at its contacts 533 closes a point in the circuit of auxiliary tape alarm relay 546, and at contacts 531 and 532 removes its positive battery from the locking circuits of relays 340 and 735, thus placing these circuits under the control of trip relay 520.

Meanwhile, upon the release of the transcriber pickup relay 515, contacts 518 thereof remove positive battery from wire DS and replace it on wire D1. The opening of wire DS opens the circuit to distributor start relay 1115. This relay however, being made slow to release, holds its armature for a fraction of a second. During this interval, a circuit is momentarily closed to motor magnet 1105 as follows: positive battery, contacts 765, 755, 745, wire 728, contacts 518, wire D1 to the F level in the distributor bank, wiper 1107, contacts 1116, 1127, 1106, magnet 1105, negative battery. The motor magnet accordingly operates on a self interrupted basis, and advances its wipers one or more steps. Upon the release of start relay 1115, contacts 1116 thereof will open this circuit, and the stepping will stop. Should the pickup relay of another dictator finder be operated at this time however, the circuit to relay 1115 will remain closed, and the distributor will continue to step until it picks up the new call. If more than one call is waiting, it will pick up the first one it encounters.

When the transcriber releases the answer key, annunciator control relay 1000 is unlocked, and releases. Break contacts 1001 thereof now close and complete a circuit through make contacts 1012 and break contacts 1046, 1034 and 1023 to the annunciator lamp 1, which lights. At the same time, make contacts 1001 open the original operate circuit to answer relay 940. This removes the shunt from the lower winding of start relay 930, which now re-operates in series with relay 940, locking the latter operated, in a circuit from positive battery at the release key RLS over wire 947, lower winding of relay 930, contacts 943, and the winding of relay 940 to negative battery.

Start relay 930 upon re-operating, at contacts 931 and 932 extends in the IN and IN ST wires through contacts 942 and 944 to the second in transcriber's finder circuit, in readiness for the next in call. Relay 930 also closes contacts 933 and 935 and opens contacts 934, but this is without effect. The relays of the dictator finder now operated are 340, 350, 510, 520, 530, 570, and 735, while in the transcriber finder, relays 920, 927, 930 and 940 are operated, and in the transcriber cabinet only code relay 1010 is operated.

The first in transcriber, after releasing the answer key, now begins the transcription by operating the play key PL, or by operating a foot switch plugged into the jack 1060, if the latter method of operation is preferred. The use of the jack disconnects the play key at the upper springs of the jack. In either case, positive battery is extended over wire 949 to play wiper 906 and its first bank contact, and thence over wire P1 to Fig. 5, where it passes through break contacts 561 to negative battery through forward relay 710.

Forward relay 710 re-operates over this circuit, and at make contacts 711 re-operates stop relay 716 from contacts 541 as before. Relay 710 also, at break contacts 711 unlocks and releases tape normal relay 570, closes contacts 713 without effect, due to the open contacts 363, and at contacts 714 prepares the recorder play circuit. Stop relay 716 then closes the recorder stop circuit, thereby rendering the play circuit effective, to start the forward movement of the tape. Due to the non-operation of record relay 725 at this time, the record and erase heads of the recorder are not energized, and only the play back head is effective.

Meanwhile, the tape normal relay 570 has released, in response to the opening of its locking circuit at break contacts 711 of the forward relay. Relay 570 thereupon, at its contacts 571 prepares the secondary circuit to forward relay 710, at contacts 578 prepares a circuit to rewind relay 580, and at contacts 574 re-operates forward control relay 560. Relay 560 in turn, at contacts 561 completes the secondary circuit to relay 710 and opens the primary circuit, at contacts 563 prepares a circuit to the rewind control relay 550, and at its preliminary make contacts 564 locks to positive battery through contacts 554 and 524.

The recorder now repeats the recorded message to the output terminals 705, from where it passes out over speech wires 785, 786, through wipers 901, 902 now standing on their first bank contacts, contacts 925, 926, amplifier 1007 and voice jack 1008 to the transcriber's headset not shown. The transcriber then proceeds to transcribe the recording and/or perform such other operations as may be necessary.

To re-play any portion of a recording, the transcriber releases the play key PL and operates the rewind key RWD, which are preferably opposite sides of the same key to prevent their simultaneous operation. The release of the play key removes positive battery from the P1 wire, thereby causing the release of the forward and stop relays 710 and 716, which stop the tape. The closure of the rewind key, on the other hand, connects positive battery over wire 948 and wiper R to wire R1, and thence through contacts 563 and 552 to the rewind control relay 550.

Rewind control relay 550 accordingly operates, and at its make contacts 552 locks direct to wire R1, while preliminary make contacts 553 prepare a second locking circuit for the lower winding of this relay. Relay 550 also, at contacts 554 opens the locking circuit to relay 560, now held from contacts 574, and at contacts 555 operates rewind relay 580, by way of break contacts 578 and 715.

Rewind relay 580 upon operating, at contacts 581 re-operates stop relay 716 to prepare the starting of the tape in the reverse direction, and at contacts 582 prepares the circuit of rewind limit relay 720, to prevent over-rewinding. Relay 580 also, at contacts 584 closes the recorder rewind circuit, and at contacts 583 connects the adjustable resistance 784 across the recorder output, and the fixed resistor 783 in series with the recorder output. As the tape is rewound, the sound is heard by the transcriber in reverse, but with reduced volume, due to the effect of the resistors now in the output. This sound tells the transcriber that the rewinding is actually in progress, and aids in determining where to stop.

To start the forward movement again, the transcriber simply releases the rewind key, and closes the play key. The release of the rewind key RWD removes positive battery from the R1 wire and the upper winding of reverse control relay 550. Relay 550, with its lower winding already open at contacts 575, releases quickly. Relay 550 thereupon, at contacts 554 re-establishes the locking circuit to relay 560, and at contacts 555 releases the rewind relay 580. Relay 580 in turn, at contacts 584 opens the recorder rewind circuit, at contacts 583 removes the resistors 783 and 784 from the recorder output circuit, and at contacts 581 releases stop relay 716. The latter relay thereupon opens the recorder stop circuit to stop the tape.

The re-closure of the play key PL now replaces positive battery on the P1 wire, thereby re-operating forward relay 710, via make contacts 561 and break contacts 571. Forward relay 710 re-closes the recorder play circuit, and re-operates stop relay 716, with record relay 725 remaining at normal, as before. The tape now resumes its forward movement, and the playback continues from that point.

*Completion of transcription*

Upon completion of the transcription, the transcriber again releases the play key, and then operates the release key momentarily. The release of the play key opens the P1 wire as before and again releases the forward and stop relays 710 and 716 to stop the recorder, while operation of the release key RLS opens the locking circuit for relays 1010, 920, 930 and 940, and all of these relays release. Code relay 1010 upon releasing, extinguishes the lighted annunciator lamp, and restores the transcriber cabinet to normal condition. Stop relay 920 upon releasing, at its contacts 921 disconnects the in start circuit from the second finder, at make contacts 923 opens the operate circuit to the hold relay 927 now locked to off normal springs 900, at break contacts 923 prepares the finder homing circuit, at contacts 924 opens the call lamp circuit, and at contacts 925 and 926 disconnects the recorder output circuit from amplifier 1007 and voice jack 1008.

Answer relay 940 upon releasing, at contacts 941 removes positive battery from lockout wire L01 to free the dictator finder circuit, at contacts 942 disconnects the IN wire from Fig. 12, at contacts 943 further opens its own locking circuit, and at contacts 944 opens another point in the in start circuit to Fig. 12. Start relay 930 upon releasing, at contacts 931 and 932 further disconnects Fig. 12, at contacts 933 disconnects stop relay 920 from pickup wiper 903, and at contacts 934 completes the finder homing circuit.

A circuit is now completed from positive battery through break contacts 923 and 934, off normal contacts 909, and interrupter contacts 951 to motor magnet 907, which operates. Relay 950 then operates, and releases the motor magnet, which advances the wipers one step, and releases relay 950. The two continue to interact in this manner until the wipers are again standing in the normal or home position. When the wipers reach the normal position, off normal contacts 900 and 909 open. Contacts 909 thereupon open the circuit to the motor magnet, to prevent its re-operation, while contacts 900 unlock and release hold relay 927. Relay 927 at contacts 928 re-connects the now open in start wire IN ST to start relay 930, and the transcriber finder is again normal and ready for another call.

Meanwhile, the removal of positive battery from lockout wire L01, in response to the release of answer relay 940, has opened the operate circuit of relays 350, 520 and 530 in the dictator finder circuit, and relays 520 and 530 release one after the other, in the order named. Lockout relay 350 remains locked however, over its upper winding, to the positive battery on wires 727 and 375. Trip relay 520 upon releasing, at contacts 521 unlocks and releases capstan motor relay 735, and at contacts 522 unlocks and releases transfer lockup relay 510. The release of relay 510 disconnects the upper locking winding of transfer relay 340, but the latter relay remains locked up over its lower winding. Trip relay 520 further, at its contacts 524 opens the locking circuit of forward control relay 560, and at its contacts 525 completes a circuit to the rewind relay 580. Trip guard relay 530 upon releasing, shortly after relays 520 and 510, re-closes contacts 531 and 532, and opens contacts 533, without effect. Forward control relay 560, being still held from contacts 574, is not affected by the opening of its locking circuit, and remains operated for the time being.

The circuit for rewind relay 580 which was completed by the release of trip relay 520, is as follows: positive battery, contacts 332, middle break contacts of busy key 319, wire 375, contacts 733, wire 727, break contacts 365, make contacts 351 and 347 in parallel, and break contacts 516, 525, 578, and 715 to negative through relay 580. Relay 580 upon operating, at contacts 581 re-operates stop relay 716, and at contacts 584 closes the recorder rewind circuit. Capstan motor relay 735 does not re-operate, since the capstan motor which it controls, is not involved in the rewind operation, and is no longer required.

Upon the completion of the rewinding, the silver spot at the starting end of the tape shorts contacts 701 as before, and again operates rewind limit relay 720. The circuit for relay 720 is the same as before, from positive battery at contacts 331 of the alarm relay, through the right hand contacts of the busy key 319, wire 718, contacts 701, wire 567, contacts 582, wire 566 and resistor 729 to relay 720 and negative battery. Relay 720 upon operating, at its contacts 721 closes a locking circuit for itself through contacts 711 and 541 independent of the tape, and at contacts 722 opens the recorder stop circuit to disable the rewind circuit and stop the tape. Relay 720 at the same time, at contacts 723 re-operates the tape normal relay 570 over its upper winding.

Tape normal relay 570 upon re-operating, at contacts 576 locks to the positive battery through contacts 711 and 541, at contacts 574 releases relay 560, and at contacts 578 releases rewind relay 580. Relay 580 thereupon, at contacts 581 and 582 releases relays 716 and 720 and at contacts 584 disconnects the recorder rewind circuit, previously disabled by limit relay 720.

The dictator finder is now more or less in its normal condition, but it is not yet completely free, nor is it yet available for another call, due to the fact that its transfer and lockout relays 340 and 350 are still operated. Relay 340 for example, is still locked over its lower winding to positive battery at contacts 331 on one side, and negative battery at contacts 244 on the other side, while relay 350 is locked over its upper winding to positive battery at contacts 332, over wires 727 and 375. The lockup of relay 340 is to provide equal use of the linefinders, and the lockup of relay 350 is to assure completion of the final rewind operation, even after release of relay 340.

Thus, in the present case, which assumed all finders idle to start, a second call would now be directed to the second finder, not shown, a third call to the third finder, and so on. In each case, the transfer relay corresponding to relay 340 operates as soon as the line relay corresponding to relay 360 has operated, and transfers the start circuit ahead to the next finder. Each transfer relay in turn also locks over its lower winding from positive battery at its own contacts 332 to the common negative battery at contacts 244 at the all-finders-busy relays, by way of wire 247. Each transfer relay further, at contacts corresponding to contacts 346, removes one of the sources of positive battery from the hold wire 256.

Now, when the last linefinder, illustrated in Figs. 4, 6, 8 is seized by a call, the operation of transfer relay 440 therein, from line relay 460, causes the removal, at contacts 446, of the last source of positive battery from hold wire 256. The all-recorders-busy relay 250 accordingly releases, after a short delay, due to being made slow to release, and in turn releases all-recorders-busy relay 240. Relay 240, upon releasing, at contacts 242 energizes the tone start lead TS, and at contacts 241 connects busy tone to all of the line circuits, so that if any dictator initiates a dictation call at this time, the operation of his line relay, such as 210, 150 or 110, will connect this busy tone to his line, as a warning that no recorder is available at the moment. Relay 240 at the same time at contacts 243 opens a common point in the linefinder start circuit, and at contacts 244 opens the locking circuit to the lower windings of all of the linefinder transfer relays.

All of the transfer relays 340, 440 etc. whose upper winding is unlocked at this time, will accordingly release. As soon as any transfer relay has released, its contacts corresponding to 346, 446 replace positive battery on wire 256, thereby re-operating relays 240 and 250. Relay 240 thereupon disconnects the busy tone, and re-connects the finder start and transfer lockup circuits.

Assuming that the original call to the first recorder is now completed, with the transcriber disconnected, the recorder rewound, tape normal relay 570 re-operated, and that transfer relay 340 has been released as stated in the preceding paragraph, a new call will be immediately picked up by the same first linefinder, whose start relay 315 will be operated as before, over the start circuit. The finder then hunts, and stop relay 320 operates to stop the hunting, whereupon line relay 360 operates, and at contacts 365 unlocks and releases lockout relay 350. The call then proceeds in the usual manner.

Should the rewinding operation not yet be completed however, and tape normal relay 570 be still in the de-energized position, the release of transfer relay 340 will do no more than disconnect the start circuit from the next linefinder. The call remains held by the first finder, but its start relay 315 cannot operate, due to the open make contacts 573 on relay 570. The absence of tick tone tells the dictator he is not yet switched through to the recorder. Upon the completion of rewinding, relay 570 re-operates to start the finder. When the call has been extended to the recorder, line relay 360 operates as before, at contacts 365 unlocks and releases lockup relay 350, and at contacts 362 and 361 returns tick tone. The dictator then proceeds with the call.

*Miscellaneous dictation call*

Should dictator A wish to make a recording to be handled by the miscellaneous transcriber rather than an in transcriber, he may do so by seizing the second line circuit of Fig. 1, instead of the first. He does this by operating key 25 rather than key 20, after removing the handset.

Upon removal of the handset, cradle switch contacts 17 and 18 move to the illustrated closed position as before, and upon the momentary closure of key 25, a circuit is closed to changeover relay 100, from positive battery through impedance coil 105, wire 30, contacts 18, contacts of key 25, and line wire 34 to negative through relay 100. Relay 100 operates quickly in this circuit, and at contacts 101, 102 extends speech wires 31 and 32 to the second line circuit, and to the PAX over contacts 163 and 165. Relay 100 also, at contacts 104 prepares a locking circuit for itself, and at contacts 103 operates line relay 150, from positive battery through key 25, line wire 33, and contacts 103, 156, and 167. The line circuit in the PAX corresponding to dictator A, which is common to both line circuits of Fig. 1, operates in the usual manner upon extension of the line loop thereto over wires 191 and 192, and the PAX returns dial tone as before.

Line relay 150 upon operating, at contacts 151 locks up connect relay 100, at contacts 152 extends a busy marking to the PAX line circuit in anticipation of its impending disconnection, at contacts 154 and 155 locks itself operated over the line loop independently of key 25, at break contacts 158 removes the positive battery marking from the F2 wire leading to the second contact of the F level in all of the linefinder banks, and at make contacts 158 closes the linefinder start circuit, by way of contacts 243 and start wire 246.

Assuming, for purposes of explanation, that the start chain has previously been extended by successive calls to the last finder circuit of Figs. 4, 6 and 8, start relay 415 therein will now operate, from the positive battery on start wire 246 extended through break contacts 333, left break contacts of busy key 319, make contacts 342, wire 348 and corresponding contacts in the intermediate finders to Fig. 4, where the circuit passes through break contacts 433, left break contacts of busy key 419, break contacts 442, wire 480, make contacts 673 and wire 481 to relay 415.

Start relay 415 upon operating, at contacts 416, 418 closes the stepping circuit to motor magnet 406, and at contacts 417 prepares the stopping circuit. Motor magnet 406 now starts operating and releasing from positive battery fed through the F level of the bank to wiper 404, from the line circuits. The wipers advance one step at each release, and when wiper 404 reaches the second bank contact, from which positive battery has been removed by line relay 150, the motor magnet does not re-operate and the stepping ceases. Stop relay 420 upon the opening of the stepping circuit now operates in series with motor magnet 406 from positive at contacts 417. Stop relay 420 immediately locks over its upper winding, disconnects the stepping circuit at contacts 424, 426, at contacts 421, 422 prepares the extension of the speech circuit, and at contacts 423 connects positive battery to test wiper 403 for the operation of line cutoff relay 160.

Cutoff relay 160 now operates over the following circuit: positive battery, contacts 445, 423, rectifier 412, wiper 403, test wire C2, contacts 157, relay 160, negative battery. Cutoff relay 160 upon operating, at contacts 168 locks directly to the C2 wire, at contacts 161 holds changeover relay 100, at contacts 162 holds the busy marking on the PAX line circuit, at contacts 163, 165 disconnects the line loop from the PAX, at break contacts 164, 166 unlocks and releases line relay 150, and at make contacts 164, 166 extends the line loop to recorder 800, by way of speech wires −L2 and +L2, wipers 401 and 402, contacts 421 and 422, and condensers 612 and 613.

Finder line relay 460 now operates over the loop, at contacts 461, 462 returns tick tone, and at contacts 463 connects a holding battery to relays 160 and 420, and operates capstan motor relay 835, which locks to contacts 631. Line relay 460 also, at contacts 464 operates transfer relay 440 and its lockup relay 610, and at contacts 465 unlocks and releases lockout relay 450, should the latter be found operated, as it usually will be. Transfer relay 440 locks operated, at break contacts 442 releases start relay 415, and at make contacts 442 prepares a further extension of the start circuit, which is ineffective in the present case. Relay 440 further, at make contacts 445 lights busy lamp 428, and at break contacts 446 disconnects the last source of positive battery from wire 256. The all-recorder-busy relays 250 and 240 accordingly release, after a short delay, and contacts 244 open the lower locking circuit of all of the transfer relays such as 340 and 440. All of these relays whose upper locking windings are now open accordingly release, and re-operate relays 250 and 240, by replacing positive battery on wire 256.

The dictator upon hearing the tick tone, now closes key 12, which connects positive to both sides of the line, as in the previous call, and causes the operation of differential relay 455. Relay 455 in turn, operates forward relay 810 over wire 477 and contacts 661, and relay 810 operates stop relay 816 from contacts 811 and 641, and record relay 825 from contacts 813 and 463. The tick tone is cut off at contacts 812, relay 670 is released at contacts 811, and the recorder play and record circuits are closed through contacts 684, 814 and 826. The recorder now starts, and the dictator begins to dictate. Forward control relay 660 also operates, upon the release of tape normal relay 670.

When the dictator hangs up the handset at the conclusion of the dictation, relays 455 and 460 release, thereby causing the release of line cutoff relay 160, finder stop relay 420, forward relay 810, recorder stop relay 816, and record relay 825. The forward movement of the recorder is thus stopped, and rewind relay 680 now operates, from positive battery through contacts 815, 678, 625, 616, 447, 465, 833, wire 475, middle contacts of busy key 419, and alarm relay contacts 432. Rewind relay 680 upon operating, at make contacts 681 re-operates stop relay 816, at make contacts 682 prepares the operation of rewind limit relay 820, and at make contacts 684 closes the recorder rewind circuit.

The recorder now rewinds, and on the completion of the rewinding, the silver spot on the starting end of the tape closes contacts 801, thereby operating limit relay 820 from positive battery through contacts 431, right contacts of busy key 419, wire 818, and contacts 801 and 682 to relay 820. Relay 820 upon operating, at contacts 822 opens the recorder stop circuit to release the recorder relays and stop the tape, and at contacts 823 re-operates tape normal relay 670. Relay 670 thereupon, at contacts 676 locks again to contacts 811 and 641, at contacts 674 releases forward control relay 660 whose locking circuit is now open at contacts 465, and at contacts 678 releases rewind relay 680. Contacts 681 and 682 thereupon open, and release the stop and limit relays 816 and 820. All relays of the linefinder are now normal except relays 440, 610, 670 and 835.

Responsive to the re-operation of tape normal relay 670, contacts 678 thereof now operate transcriber pickup relay 615, from positive battery through contacts 453, 627, 645, 678, 625, 616, 447, 465, wire 827, contacts 833, wire 475, middle contacts of busy key 419 and contacts 432. Pickup relay 615 upon operating at contacts 617 locks to wire 827 through contacts 626, 447 and 465, at break contacts 618 disconnects positive battery from wire D7 leading to the distributor of Fig. 11, and at make contacts 618 connects the same positive battery to distributor start wire DS, to operate distributor start relay 1115.

Distributor start relay 1115 operates over this circuit, from positive battery through contacts 865, 855, 845 and 618, and at contacts 1116 connects motor magnet 1105 to test wiper 1107. Assuming that the distributor wipers are not now standing on the seventh bank contacts, positive battery from break contacts corresponding to contacts 618 in the other dictator finders on the corresponding contacts of test bank F will now energize motor magnet 1105 by way of wiper 1107. Motor magnet 1105 now operates and releases by interrupting its own circuit, and advances the wipers quickly to the seventh contacts of the bank. Due to the absence of positive battery on wire D7, wiper 1107 can no longer re-operate the motor magnet, and the switch stops. The absence of direct positive on wiper 1107 at the same time permits the operation of stop relay 1125 from contacts 1156, in series with the motor magnet, which will not re-operate through the resistance of relay 1125. Relay 1125 locks operated, disconnects wiper 1107 from the motor magnet, and connects positive battery to the marking and pickup wipers 1108 and 1109, and through them to the marking and pickup wires M7 and PU7.

Switching relay 870 and identity relay 1120 now operate in parallel from marking wiper 1108 over the following circuit: positive battery through contacts 1156, 1146, 1136, 1126, wiper 1108, wire M7 to relay 870, and thence across Figs. 8, 6 and 4 to the dictator finder wiper 405 and the second bank contact on which it is standing, and over wire 2 in cable ID to relay 1120. The operation of relays 870 and 1120 in turn causes the operation of the miscellaneous transcriber finder start relay 1330 over the following circuit: positive battery, contacts 1122, jumper block 1104, wire 793, contacts 874 and 863, miscellaneous start wire MIS ST to Fig. 13, and through contacts 1313, 1321, 1328, and relay 1330 to negative battery.

Start relay 1330 upon operating, at contacts 1333 connects stop relay 1320 to pickup wiper 1303, and at contacts 1335 closes a circuit to motor magnet 1307. Motor magnet 1307 and interrupter relay 1350 now interact to start the switch hunting the call, which is marked by positive battery on pickup wire PU7 from the distributor. When therefore, the seventh bank contact is reached, stop relay 1320 operates in the following circuit: positive battery, contacts 1156, 1146, 1136, 1126, wiper 1109, wire PU7 in cable 915, wiper 1303, contacts 1333, and relay 1320 to negative battery. Stop relay 1320 upon operating, at contacts 1321 releases start relay 1330, at contacts 1322 locks over wire 1347 to the release key of the miscellaneous transcriber cabinet not shown, and at contacts 1323 operates hold relay 1327, which locks to the now operated off normal springs 1300. Relay 1320 also, at contacts 1324 operates the call lamp and buzzer in the transcriber cabinet, and at contacts 1325, 1326 extends the recorder output wires 885, 886 to the voice jack of the transcriber's cabinet.

The miscellaneous transcriber responds in the same manner as already described for the first in transcriber, the only difference being that upon operation of the answer key, the second code relay corresponding to relay 1020 will operate from contacts 1121 of the operated identity relay 1120, over the multipled code wire B. And upon release of the answer key, annunciator lamp 2 will light instead of lamp 1 as before, thus indicating that the call is from dictator A over the second line circuit. Also, upon the operation of answer relay 1340, cutoff relay 1155 rather than 1135 operates in parallel therewith, over contacts 1346 and wire T5, to start the release of the distributor.

*Other dictation calls*

Dictator B, not shown, is also assumed to have access to two dictator line circuits, one for use on in calls and the other for use on miscellaneous calls like dictator A, as indicated by the cross connections for lines 3 and 4 on the cross connecting block 1104.

Accordingly, calls from dictator B will be handled exactly like calls from dictator A, except for the operation of different identity and code relays. Thus, on a call through the third line circuit, the dictator line finder employed will stop on the third bank contacts, so that when the distributor stop relay 1125 connects positive battery to marking wiper 1108, identity relay 1130 will be operated, over cable ID. Contacts 1132 of this relay will now direct the call to an in transcriber, such as shown in Figs. 9 and 10, and when the transcriber responds, contacts 1131 will operate the third code relay 1030. And upon release of the answer key, annunciator lamp 3 will light, via contacts 1001, 1012, 1022, 1032, 1043.

On a call from dictator B through the fourth line circuit, the fourth identity relay 1140 will operate in similar manner. Contacts 1142 of this relay will direct the call to a miscellaneous transcriber, by energizing the start wire thereto, while contacts 1141 will prepare the operation of the fourth code relay corresponding to relay 1040 in the miscellaneous transcriber's cabinet. And when the miscellaneous transcriber operates the answer key momentarily in response to the call signal, relays corresponding to relays 1000 and 1040 cause annunciator lamp 4 in the cabinet to light, via contacts such as 1001, 1012, 1022, 1032, 1042.

Dictators C and D, not shown, are assumed to be connected respectively to the fifth and sixth line circuits, not shown, which are assigned to out calls, as indicated by the fifth and sixth cross connections on terminal block 1104. Calls from these lines are handled like the calls already described, except for being directed to an out transcriber's position, not shown.

Thus, in the case of a call from dictator C, and assuming use of the first recorder, upon the finding of this recorder by the distributor following the completion of the dictation, positive battery over the marking wipers 1108 and 305 causes the operation of the fifth identity relay 1150, in addition to the usual operation of switching relay 770, by way of wire M1 and cable ID. Contacts 1153 of identity relay 1150 thereupon connect positive battery to the out start wire, by way of terminal block 1104, wire 792 and contacts 775 and 753 to out start wire OUT ST. This operates a start relay corresponding to relay 930 in an out transcriber finder, which then proceeds to find the calling recorder in the usual manner. The transcriber finder stop relay then signals the transcriber, who responds by operating the cabinet answer key. Upon the resulting operation of the annunciator control relay, contacts 1151 and 1152 of identity relay 1150 cause operation of code relays corresponding to relays 1010 and 1020, over a branch of the multipled code wires A and B. And upon the release of the annunciator control relay, annunciator lamp 5 in the cabinet will light, over contacts such as 1001, 1012, 1046, 1034, 1023.

A call from dictator D through the sixth line circuit would be directed to an out transcriber in like manner, with identity relay 1160 operating from the distributor to prepare the operation of code relays corresponding to relays 1010 and 1030, over a branch of code wires A and C. These relays in turn, in response to release of the answer key by the answering transcriber, light annunciator lamp 6, over contacts such as 1001, 1012, 1046, 1034.

The line circuit for dictator E, which is similar to those for dictators C and D, not shown, operates like the line circuits of Fig. 1, disregarding the connections of changeover relay 100. A call from dictator E through this seventh line circuit will be directed to a miscellaneous transcriber by the operation of the seventh identity relay 1170, and the closure of its contacts 1173. And when the transcriber operates the answer key in response to the call signals, code relays corresponding to relays 1010 and 1040 will operate from contacts 1171 and 1172 to prepare the lighting of annunciator lamp 7, via contacts 1001, 1012, 1046.

The remaining line circuits, if or when used, would cause operation of identity relays 1180, 1190 or 1100. Identity relay 1180 is connected to operate the second and third code relays such as 1020 and 1030, over wires B and C; code relays 1020 and 1030 in turn prepare the lighting of annunicator lamp 8, via contacts such as 1001, 1012, 1022, 1033, 1045. Identity relay 1190 is connected to operate code relays 1020 and 1040, over wires B and D; code relays 1020 and 1040 in turn prepare the lighting of annunciator lamp 9, over contacts such as 1001, 1012, 1022, 1033, 1044. And identity relay 1100 is connected so as to operate code relays 1030 and 1040 over wires C and D; while code relays 1030 and 1040 are arranged to light annunciator lamp 0, over contacts such as 1001, 1012, 1022, 1032, 1043.

*Overflow dictation calls*

If an "in" recording is completed at a time when the first transcriber is already occupied with a call, the distributor of Fig. 11, as soon as it has found the recorder involved and operated stop relay 1125, proceeds to operate identity relay 1110 or 1130 in the usual way, via the M wipers of the distributor and line finder switches. The operated identity relay then energizes the in start wire IN ST via wire 791 and contacts such as 776 and 743. Since relays 920, 927, 930 and 940 in the first transcriber finder circuit are now in the operated position, the in start circuit now extends through contacts 913, 921, 932, 944, 1213, 1221 and 1228, to the start relay 1230 in the second transcriber finder of Fig. 12. This finder now proceeds to hunt the new call, in accordance with the marking on the PU level of its bank, from the PU level of the distributor bank. Stop relay 1220 then operates and locks, and at contacts 1224 connects positive battery to wire 1236 leading to call signals in the associated transcriber cabinet not shown. The second transcriber then responds by operating the answer key and the call proceeds to conclusion and release, in the same manner already described, since all of the transcriber circuits are similar. Upon the operation of the answer key, distributor cut off relay 1145 is operated, in this case, over its upper winding via wire T2, to release the distributor.

If both in transcribers should still be occupied with calls when a third in call is switched through, the in start lead will not be energized, but the call will be held, and a special signal will be given to both transcribers. Let it be supposed for example, that such a call has been recorded on the first recorder by dictator A, that the dictator has hung up, and that relays 355, 360, 120, 320, 710, 716 and 725 have all released in response, as originally described, leaving only relays 340, 510, 560 and 735 operated in Figs. 3, 5, and 7.

Rewind relay 580 now operates as before, from positive battery on wires 375 and 727 through contacts 365, 347, 516, 525, 578, 715. Stop relay 716 then re-operates from relay 580, and the recorder rewinds. At the conclusion of rewinding, the silvered portion of the tape operates limit relay 720, as before, from the positive battery on wire 718. Limit relay 720 thereupon, at contacts 721 locks through contacts 711 to contacts 541, at contacts 722 stops the tape, and at contacts 723 re-operates tape normal relay 570. Relay 570 re-operating, releases relays 560, 580 and 720, and at make contacts 578 operates transcriber pickup relay 515, from the positive battery on wire 727, through contacts 365, 347, 516, 525, 578, 545, 527, 353.

Pickup relay 515 now operates distributor start relay 1115 over wire DS, from the positive battery through break contacts 765, 755 and 745 in series, which is removed from wire D1 at the same time. The distributor now finds the calling first recorder finder, and then operates its stop relay 1125. Relay 1125 locks to the cut-off relays 1135, 1145, 1155, and connects positive battery to the M1 and PU1 wires, and the positive on the M1 wire causes operation of the switching and identity relays 770 and 1110, as before. Identity relay 1110 in turn, at contacts 1112 again connects positive battery to start wire 791. Now however, due to the busy condition of the two in transcribers' finder circuits, this positive battery causes operation of the in-call-waiting relay 740 over the following circuit: positive battery, contacts 1112, wire 791, contacts 773 and 742, relay 740, wire IN, and contacts 931, 942, 1231 and 1242 to negative battery through resistor 1260.

In-call-waiting relay 740 operates quickly in this circuit, and at its preliminary make contacts 741 locks to positive battery at break contacts 523 of trip relay 520. Relay 740 also, at contacts 742 opens its original operating circuit, and at contacts 743 disconnects the in start wire IN ST, already open at contacts such as 921 and 1221. Relay 740 further, at contacts 744 connects positive battery to the in-call-waiting wire IN CW, at make contacts 745 reconnects positive battery to the distributor bank wire D1, and at break contacts 745 disconnects positive battery from wires 728 and DS.

The call waiting lamps CW in the two in transcriber cabinets now light, in response to the positive battery from contacts 744 on the IN CW wire. The circuit to the first call waiting lamp is by way of break contacts 915 and wire 917, while the circuit to the second lamp is over wire 998, break contacts 1215, and wire 1217. At the same time, the removal of positive battery from wire DS starts the release of distributor start relay 1115, while the connection of positive battery to wire D1 operates the distributor cut-off relay 1135 over the following circuit: positive battery, break contacts 765, 755, make contacts 745, wire D1, distributor wiper 1107, make contacts 1116, 1127, and the upper winding of relay 1135 to negative battery.

Cut-off relay 1135 upon operating, at contacts 1136 opens the locking circuit to stop relay 1125, as well as the operate circuit of switching relay 770 and identity relay 1110, and these three relays release quickly. Identity relay 1110 thereupon removes positive from wire 791, while switching relay 770, at contacts 776 disconnects wire 791 from wire IN ST, and at contacts 773 opens the original operating circuit to call waiting relay 740, now locked to contacts 523. Stop relay 1125 at the same time, at contacts 1126 disconnects the distributor marking and pickup wipers 1108 and 1109, at break contacts 1127 re-establishes the distributor stepping circuit momentarily, and at make contacts 1127 releases cut-off relay 1135. If the slow-to-release distributor start relay 1115 has not yet released at this time, motor magnet 1105 may re-operate one or more times to advance the wipers. This action will cease however, when relay 1115 releases. The distributor is then normal, but the dictator finder remains held, with relays 340, 510, 515, 570, 735 and 740 now in the operated position.

Either in transcriber may pick up the waiting call, depending on which operates his release key first, upon completion of the previous transcription. Assuming this to be the first transcriber, the momentary operation of the release key RLS of Fig. 10 unlocks and releases the operated code relay in Fig. 10, and the stop, start and answer relays 920, 930 and 940 in Fig. 9. The release of relays 920 and 930 closes the finder homing circuit to motor magnet 907, through off-normal contacts 909. The finder switch of Fig. 9 is now stepped to the home position, in the manner previously explained, whereupon the off normal contacts 909 and 900 open, and unlock hold relay 927, and stop the stepping.

Upon release of the start and answer relays 930 and 940 also, contacts 941 start the release of the dictator finder used in the previous completed call, while contacts 931 and 942 open the circuit of the operated in-call-waiting relay 740. Relay 740 accordingly releases, and at contacts 744 extinguishes the in-call-waiting lamps. Relay 740 further, at make contacts 745 again removes positive battery from the distributor bank wire D1, and at break contacts 745 re-connects it to the distributor start wire DS, by way of wire 728 and make contacts 518 of the still operated pickup relay 515.

Distributor start relay 1115 now operates over the DS wire, and the distributor begins to step, under the control of wiper 1107 as before. The absence of positive on bank wire D1, causes the distributor to stop on the first bank contact, and permits the operation of stop relay 1125, in the manner previously explained. Relay 1125 then re-operates the switching and identity relays 770 and 1110 in multiple, and the latter two relays again close the in start circuit to relay 930 over wire 791 and contacts 776 and 743. The first dictator finder now steps to the first bank contact as marked by the distributor on the pickup wire PU1. Stop relay 920 then re-operates, and operates the call buzzer and call lamp. The transcriber then operates the answer key, and the transcription proceeds in the usual way.

In the case of an out call with both out transcribers busy, the operation will be similar, except that now an out-call-waiting relay such as relay 750 will operate from the identity relays, over wire 792, contacts such as 772 and 752, and through relay 750 to resistance battery over the out wire OUT. Relay 750 then operates the out-call-waiting lamps from contacts 754, over wire OUT CW, and at contacts 755 releases the distributor.

Similarly, if the miscellaneous transcriber is still occupied with a call when a second miscellaneous call is switched through, a miscellaneous-call-waiting relay such as relay 760 will operate from the identity relays, over wire 793, contacts such as 771 and 762, and through relay 760 to resistance battery over wire MIS and contacts 1331 and 1342. Relay 760 then releases the distributor and at contacts 764 lights a miscellaneous-call-waiting lamp, not shown, by way of wire MIS CW, contacts 1315, and wire 1317.

Whenever a transcribed position is unmanned, for any reason, the busy key BY in the cabinet will ordinarily be left in the operated position. This operates the busy relay such as 910, 1210 or 1310 in the associated finder circuit, The busy relay thereupon disconnects the local start relay and the local call waiting lamp, and extends the incoming control wires to the outgoing terminals, or to the next position, if such be provided. In the case of busy relay 910 for example its operation will extend the in, in start, and in call waiting wires to the finder of Fig. 12, and all incoming calls will be handled by the second in transcriber. Where busy relay 1210 is operated all in calls will be handled by the first in transcriber, since the second start relay 1230 would then be disconnected.

Should busy relays 910 and 1210 both be operated at the same time, all in calls will be extended to the miscellaneous transcriber in the following manner. Assuming again the use of the first recorder, and that the distributor has operated switching relay 770 and one of the identity relays 1110 or 1130 over wiper 1108, the operated identity relay again connects positive battery to wire 791. This positive battery now passes through contacts 776 and 743 to the in start wire IN ST as before, but from there it is now extended through contacts 912 and 1212 and wire MIS ST to Fig. 13 where it causes the operation of start relay 1330, by way of break contacts 1313, 1321 and 1328. This finder then hunts the distributor marking on the PU1 wire, and the attendant transcriber responds in the manner described.

Should the miscellaneous transcriber be occupied with another call at the time of such an extension of an in call, start relay 1330 will be disconnected from the MIS ST wire at contacts 1321 and 1328. At the same time the MIS wire will be extended to negative battery through contacts 1331 and 1342. The positive on wire 791 therefore will now cause the operation of in-call-waiting relay 740 by way of contacts 773 and 742, relay 740, wire IN, contacts 911 and 1211, wire MIS, contacts 1331 and 1342, and resistor 1360. Relay 740 thereupon releases the distributor at its contacts 745 in the manner already explained, and at its contacts 744, lights the miscellaneous call-waiting lamp. The latter circuit may be traced as follows: positive battery, contacts 744, wire IN CW, contacts 914 and 1214, wire MIS CW to Fig. 13, contacts 1315, and wire 1317 to negative battery through the call waiting lamp, not shown. The extension of out calls is taken care of in similar manner.

*Forward overrun alarm*

Should the recorder tape be allowed to run too long, either in recording or transcribing, a reel diameter arm not shown, closes a pair of contacts represented by contacts 702 in the first recorder. If this occurs during recording, relays 340, 355, 360, 510, 560, 710, 716, 725 and 735 in the dictator finder will be in the operated position.

When therefore contacts 702 close, a circuit is closed to tape normal relay 570 as follows: positive battery from contacts 321, busy key 319, wire 718, contacts 702, and the lower winding of relay 570 to negative battery. Relay 570 operates in this circuit, and at contacts 571 causes the releases of the forward, stop and record relays 710, 716 and 725. This stops the tape. Relay 570 also, at contacts 574 opens the operate circuit to forward control relay 560, but this relay remains locked through make contacts 365 to wire 727. Relay 570 further, at contacts 577 operates tape alarm relay 540, via contacts 565.

Tape alarm relay 540 upon operating, at break contacts 541 disables the locking circuit to the upper winding of relay 570, at make contacts 541 energizes the tone start wire, and at contacts 542 connects busy tone to the dictator's line, by way of condenser 367 and make contacts 361. Relay 540 also, at contacts 544 locks direct to make contacts 577, and at contacts 545 prepares a new circuit to rewind relay 580.

The dictator now hangs up, whereupon relays 355, and 360 release. Make contacts 365 thereupon open the locking circuit to relay 560 which releases. Break contacts 365, at the same time complete a circuit for rewind relay 580 as follows: positive from contacts 332 on wire 375, break contacts 733 and 365, contacts 347, 516, 525, make contacts 578 and 545, break contacts 528, rectifier 566, and break contacts 715 to relay 580. Relay 580 operates in this circuit and at make contacts 581 and 584 re-operates stop relay 716 and starts the rewinding operation. After a certain amount of tape has been rewound on the reel, contacts 702 open. This opens the circuit to the lower winding of relay 570. The locking circuit to the upper winding being now open at break contacts 541 of the tape alarm relay, relay 570 releases. Contacts 574 of relay 570 thereupon reoperate relay 560, while contacts 577 unlock and release tape alarm relay 540. Contacts 578 at the same time transfer the circuit for rewind relay 580 direct to the positive on wire 727 through contacts 365, 347, 516, 525. Rewind relay 580 accordingly holds, and completes the rewinding. This done, the recorder stops and calls for a transcriber in the manner already described, through the re-operation of tape normal relay 570 and the operation of transcriber pickup relay 515.

If the overrun occurs during transcribing, the action is slightly different, since different conditions prevail, and a different set of relays are found in the operated position at this time, in the dictator finder. These are relays 340, 350, 510, 520, 530, 560, 710, 716 and 735.

Now, if an overrun causes closure of diameter arm contacts 702, tape normal relay 570 again operates over its lower winding, and stops the recorder by releasing the forward and stop relays 710 and 716. Relay 570 at the same time, at contacts 574 again opens the circuit to relay 560, but this relay is now locked to positive at contacts 524 of the operated trip relay 520, and remains operated. Relay 570 also, at contacts 577 again operates tape alarm relay 540. Now however, due to trip guard relay 530 being operated, relay 540 operates auxiliary tape alarm relay 546, over contacts 543. Tape alarm relay 540 at the same time, at contacts 542 connects busy tone to the recorder output circuit, by way of condenser 367, break contacts 361, and wire 509 to output wire 786. Auxiliary relay 546 upon operating, at contacts 547 shunts make contacts 563 in anticipation of the release to come of relay 560, at contacts 548 disables the locking circuit of rewind control relay 550, and at contacts 549 prepares a new circuit for rewind relay 580.

The transcriber, on hearing the busy tone, knows that the recorder has stopped, for some reason. If the transcription has been satisfactorily completed, the transcriber may release the connection by releasing the play key and operating the release key. The release of the play key removes positive from the P1 wire but this is now without effect, since the circuit to relay 710 which it controlled is already open at contacts 561 and 571 of the operated relays 560 and 570. The operation of the release key releases the transcriber finder, which in turn removes positive battery from lockout wire LO1. Relays 520 and 530 release in succession, and unlock and release relays 510, 560, and 735, in the manner previously described. Relay 530 also releases auxiliary relay 546.

The release of relay 520 also closes a circuit to rewind relay 580 from the positive on wire 727 through contacts 365, 347, 516, 525, 578, 545, 528 and 715. The recorder now begins the rewinding, and as soon as contacts 702 open, relay 570 releases; re-operates relay 560, releases relay 540, and holds relay 580 to complete the rewinding. Upon the completion of rewinding, relay 720 stops the tape and re-operates relay 570 which releases relay 560, and frees the recorder for a new call.

If the transcriber wishes a repetition of the final part of the recording however, after allowing the tape to overrun, and getting the busy signal as stated, he may do so, by operating the rewind key RWD instead of the release key RLS. Operation of the rewind key connects positive battery to wire R1 in the manner previously described. It should be remembered that at this time, relays 340, 350, 510, 520, 530, 540, 546, 560, 570, and 735 are in the operated position.

Positive on the R1 wire accordingly now operates rewind control relay 550 through contacts 547, as well as through contacts 563 and 552. Relay 550 does not lock over its lower winding, due to the open contacts 548, but it locks its upper winding to wire R1. Relay 550 also at contacts 554 unlocks and releases relay 560. Relay 550 further, at contacts 555 closes a new circuit for rewind relay 580, by way of make contacts 578, 545, 549, rectifier 566, and break contacts 715. Relay 580 operating, re-operates stop relay 716 and starts the rewinding. When enough tape has been rewound to open contacts 702, relay 570 releases, causing the re-operation of relay 560 and the release of relay 540. Relay 540 in turn, disconnects the busy tone and releases relay 546. Relay 550 is now held under control of the R1 wire since its locking circuit is now open at contacts 575. Rewind relay 580 also remains held after the release of relay 570 in a local circuit including make contacts 555 and break contacts 578 and 715. Upon the release of the rewind key therefore, relay 550 releases and opens this circuit. Relay 580 then releases and releases stop relay 716 and the rewinding stops. Forward movement in the play position may now be resumed, by re-operating the play key PL.

*Broken tape alarms*

Should the recorder tape break at any time, a broken tape lever arm, not shown, which normally rides on the tape, will fall and close a pair of contacts represented by the recorder contacts 706 shown in the lower left corner of the recorder 700. This will cause direct operation of A. C. relay 730, which will act to stop the recorder, and operate suitable alarm signals.

If the tape break occurs during recording, with relays 340, 355, 360, 510, 560, 710, 716, 725 and 735 operated, the action may be summarized as follows. Upon the operation of relay 730, contacts 731 thereof close a circuit to an alarm buzzer not shown. from positive on wire 718 coming from break contacts 331, while contacts 732 connect the same positive to wire 724 to hold the transfer and transfer lockup relays 340 and 510. At the same time, make contacts 733 connect the positive from contacts 332 on wire 375 to the broken tape alarm lamp 534, and thence through rectifier 535 to tape alarm relay 540. Alarm lamp 534 thereupon lights, and relay 540 operates.

Tape alarm relay 540 upon operating, at break contacts 541 releases stop relay 716 to stop the forward movement of the tape, and at contacts 542 connects busy tone to the dictator's line, through condenser 367 make contacts 361. If the dictator wishes to determine whether the signal represents a broken tape or a tape overrun, he may do so by releasing the push button 12, thereby releasing relay 355, and the forward and record relays 710 and 725. Upon the release of relay 710, tick tone is superimposed on the busy tone already on the dictator's line, by way of break contacts 572, make contacts 562, break contacts 712, make contacts 362 and 361 and condenser 367.

The dictator will then hang up and initiate a new call, to seize a different recorder. An attendant will then repair and rewind the tape, and place the linefinder in condition to be seized on the next cycle of operations. This may require the manual unlocking of relays 510 and 735. Relays 730 and 540 release as soon as the broken tape contacts 706 are opened by the resetting of the lever arm, and the incompleted recording is erased when the next recording is made. If repairs cannot be made immediately the recorder may be busied out for an indefinite period by operating busy key 319. This transfers the start circuit to the next linefinder independently of relay 340, disables the local start circuit and other local circuits, and lights busy lamp 328.

If the tape break occurs during transcribing, with relays 340, 350, 510, 520, 530, 560, 710, 716 and 735 operated, the action is similar to the foregoing, with relays 730 and 540 operating to control the alarm signals, and relay 716 releasing to stop the tape. Relay 540 at the same time, at contacts 543 operates relay 546, and at contacts 542 connects busy tone to the transcriber's line, through condenser 367, break contacts 361, and wire 509. The tick tone circuit is not involved, being now open at make contacts 362. To determine whether the trouble is a tape overrun or a broken tape, the transcriber on hearing the busy tone will release the play key PL and operate the rewind key RWD. Release of the play key releases relay 710, and operation of the rewind key operates relay 550 over wire R1. Relay 550 operates rewind relay 580 over contacts 555, 578 and 715, and relay 580 in turn re-operates 716 to start the rewinding. Relay 540 remains operated however, and the busy tone stays on the line. From the persistence of the busy tone the transcriber knows he has to do with a broken tape, and will release the rewind key and operate the release key to release the connection. The recorder will be inaccessible to further calls, until repairs are made.

*Off normal alarm*

If for some reason, the tape should fail to return completely to its normal starting position after the final release of a recorder by a transcriber, or if tape normal relay 570 should fail to re-operate in response to the final rewinding of the tape, on the next call to this recorder, a special alarm will be given in the following manner.

Upon the initiation of the call, positive battery is connected to the finder start wire 246 by the line circuit equipment and is extended through break contacts 342 to wire 380 in the usual manner. Now however, due to the non-operation of relay 570, this positive instead of operating start relay 315, passes through break contacts 573 to wire 376, and thence through break contacts 341 to negative battery through the tape-off-normal alarm relay 310 and alarm lamp 327 in parallel. The alarm lamp lights, and relay 310 operates, in this circuit. Relay 310 closes a circuit to an emergency alarm bell, not shown, from positive through contacts 331 and 311. An attendant noting the signal will quickly extend the start circuit by operating busy key 319, and will then proceed to find and remedy the trouble. The dictator not hearing any tick tone, may hold on or hang up and try again after an interval. Relay 310 could of course be arranged to extend the start circuit automatically, but this feature has not been shown, in order to avoid further complicating the drawing.

*Amplifier alarms*

Should the plate power supply to the amplifier 703 of the first recorder fail, the wires 1414 leading to Fig. 14, shown with Fig. 2, will be de-energized. The recorder amplifier alarm relay 1410, normally held operated over this circuit, will thereupon release and at contacts 1411A will operate an alarm buzzer not shown, over wire 1413. Relay 1410 at the same time, at contacts 1411 operates amplifier alarm relay 330, over wire 1412. Relay 330 thereupon, at contacts 333 transfers the start circuit to the next line-finder, at break contacts 331 disconnects positive battery from wire 718 and from contacts 311 and 344, at break contacts 332 disconnects positive from wire 375 and contacts 346, and at make contacts 331 and 332 lights the busy lamp 328 and the amplifier alarm lamp 329. Alarm relay 1440 is similarly controlled from the last recorder's amplifier 803 for the control of alarm relay 430, and the recorders not shown control similar alarm relays not shown.

In similar manner, the transcriber amplifier alarm relays such as 1450 and 1490 and other intervening relays not shown, are controlled individually from the different transcriber amplifiers. If for example, the plate supply circuit fails in transcriber amplifier 1007, the resulting de-energization of wires 1457 will cause the release of the normally operated transcriber amplifier alarm relay 1450. Relay 1450 thereupon, at contacts 1452 starts an alarm buzzer not shown (a common buzzer may be employed), and at contacts 1451 lights an alarm lamp 1453 and operates the transcriber busying out relay 910 over wire 1455. The rectifier in this circuit prevents the lighting of lamp 1453 when the transcriber's position is busied out in the normal manner by the operation of the busy key BY in the transcriber's cabinet. The operation of relay 910 will busy out the first transcriber's position and cause all in calls to be extended automatically to the second position, until the trouble is cured and alarm relay 1450 re-operates, to release relay 910.

Although the invention has been illustrated by a particular embodiment thereof, it should be understood that various modifications may be made therein without departing from the spirit and scope of the invention as defined in the claims.

What is claimed is:

1. Equipment for use in a recording-transcribing system comprising a recorder, a plurality of remote dictating stations, a remote transcribing station, means controlled from any one of said dictating stations for connecting said station to said recorder, and for making said recorder inaccessible to the other dictating stations, means for making a recording over said connection, means controlled from said dictating station for releasing said connection, means operated responsive to said release for rewinding said recorder and connecting said recorder to said transcribing station, means for causing said recorder to repeat said recording over said last connection, means controlled from said transcribing station for releasing said last connection, and means operated responsive to said last release for again rewinding said recorder, and making said recorder again accessible to the other dictating stations.

2. Equipment for use in a recording-transcribing system comprising a plurality of recorders, a plurality of dictating stations, a transcribing station, means controlled from any one of said dictating stations for connecting said station to an idle one of said recorders and making said recorder inaccessible to the other dictating stations, means for making a recording on said recorder over said connection, means controlled from said dictating station for releasing said connection, means operated responsive to said release for connecting said recorder to said transcribing station and signalling said transcribing station, means controlled from said transcribing station for causing said recorder to repeat said recording over said last connection, means controlled from said transcribing station for releasing said last connection, and means operated responsive to said last release for making said recorder again accessible to the other dictating stations.

3. Equipment for use in a recording-transcribing system comprising a plurality of recorders, a plurality of dictating machines, a plurality of transcribing stations, means controlled from any one of said dictating stations for connecting said station to an idle one of said recorders, and for making said recorder inaccessible to the other dictating stations, means for making a recording over said connection, means for releasing said connection, means operated responsive to said release for rewinding said recorder and connecting it to an idle one of said transcribing stations, automatic means for signalling said connected transcribing station, means controlled from said transcribing station for causing said recorder to repeat said recording over said last connection, means for releasing said last connection from said transcribing station, and means operated responsive to said last release for again rewinding said recorder and for making said recorder again accessible to the other dictating stations.

4. Equipment for use in a recording-transcribing system comprising recorders, dictating stations, transcribing stations, means controlled from any one of said dictating stations for seizing an idle one of said recorders and extending a speech connection thereto from said station, means for making a recording on said seized recorder over said connection, means for releasing said connection from said dictating station, means operated responsive to such release for selecting and signalling an idle one of said transcribing stations and extending a speech connection thereto from said recorder, means under control of said transcribing station for causing said recorder to repeat said recording over said last connection, means for releasing said last connection from said transcribing station, and means operated responsive to such release for freeing both said transcribing station and said recorder for further calls.

5. In a recording-transcribing system as in claim 4, lamp signals at said transcribing stations corresponding to said dictating stations, and means including said transcribing station selecting means for lighting one of said lamps at said selected transcribing station to indicate the dictator station source of said recording.

6. In a recording-transcribing system as in claim 4 lamp signals at said transcribing station corresponding to the different dictating stations, and means jointly controlled by said transcribing station selecting means and said selected transcribing station for lighting one of said signal lamps at said selected station to indicate the source of said recording.

7. In a recording-transcribing system, recorders, dictating stations arranged in classes, transcribing stations arranged in corresponding classes with one or more stations in each class, means controlled from any one of said dictating stations for seizing any free one of said recorders and extending in speech connection thereto from said one station, means for making a recording on said one recorder over said connection, means operated responsive to release of said connection by said dictating station for selecting and signalling an idle transcribing station of the class corresponding to that of said one dictating station, and for extending a speech connection to said transcribing station from said recorder, means controlled from said transcribing station for causing said recorder to repeat said recording over said last speech connection, and means operated responsive to release of said last connection by said transcribing station for freeing said recorder to enable its seizure by another dictating station in any of said classes.

8. A recording-transcribing system as in claim 7, including an answer key at said transcribing station for acknowledging said signal, and means operated responsive to operation of said answer key for causing a second transcribing station of the same class to be selected and signalled in response to a subsequent release by a dictator of a recorder having another recording of this class while the first transcriber is still connected to the first recorder.

9. A recording-transcribing system as in claim 7, including means operated responsive to the release of a recorder connection by a dictator at a time when all transcribing stations of the corresponding class are connected to other recorders, for causing special call-waiting signals to be given at all of such connected transcribing stations of the class.

10. A recording-transcribing system as in claim 7, including a busy key at each transcribing station, means operated responsive to the operation of the busy key at any transcribing station of a class to cause recorders carrying recordings of this class to be connected to another transcribing station of the same class, and means operated responsive to all busy keys of a class being operated for causing recorders carrying recordings of this class to be connected to a transcribing station of a different class.

11. A recording-transcribing system as in claim 7 wherein said transcriber selecting means is in two sections, one individual to the various transcribing stations and one common to said transcribing stations, an answer key at each transcribing station, and means operated responsive to operation of any one of said answer keys in response to said seizure signals for freeing said common section for use in another call, thereby to enable a plurality of said transcribing stations to be connected to recorders for transcription contemporaneously.

12. In a recording-transcribing system, recorders, dictating stations arranged in classes, transcribing stations arranged in corresponding classes, selecting means controlled from any one of said dictating stations for selecting any free one of said recorders and extending a speech connection thereto from said station, means for making a recording on said recorder over said connection, selecting means operated responsive to release of said connection by said dictating station for selecting an idle transcribing station of the class corresponding to that of said dictating station and extending a speech connection thereto from said recorder, means controlled from said selected transcribing station for causing said recorder to repeat said recording thereto over said last speech connection, a cross-connecting terminal block for fixing the class of said dictating stations, and said selecting means so arranged that any dictating station may be changed from one class to any other class by changing a single cross-connection on said terminal block.

13. In a recording-transcribing system, a plurality of dictator stations arranged in first second and third classes, a plurality of transcriber stations arranged in corresponding classes, a plurality of recorders, means controlled from any dictator station for seizing any one of said recorders, means controlled from such dictator station for making a recording on said seized recorder, means controlled from such dictator station for releasing said recorder at the end of said receording, means operated responsive to said release for causing said recorder to seize and signal a transcriber station of the same class as said dictator station, a busy key at each transcriber station of the first and second class, means operated responsive to the operation of the busy keys at all of the transcriber stations of either class for causing recorders having a recording of the corresponding class to seize and signal a transcriber station of the third class in response to said release, and means controlled from any such seized and signalled transcriber station for causing such released recorder to repeat its recording to such transcriber station.

14. In a recording-transcribing system as in claim 13, annunciator lamps at said seized third class transcriber station, said lamps corresponding with said dictator stations, and means at least partly controlled and operated by said recorder seizing means and said transcriber station seizing means for causing the lighting of one of said lamps to indicate the dictator station from whence originated the said recording.

15. In a recording-transcribing system, a plurality of dictator stations arranged in first, second, and third classes, a plurality of recorders each accessible to any dictator station, a plurality of transcriber stations arranged in similar classes and each accessible to any recorder, means operated from any dictator station for seizing one of said recorders, means controlled from said dictator station for making a recording on said seized recorder, means controlled from said dictator station for releasing said recorder, means operated responsive to said release for causing said recorder to seize and signal a transcribing station of the same class as said dictator station, means operated under control of any such seized and signalled transcriber station for causing such recorder to repeat said recording thereto, means controlled from said first and second class transcriber stations for causing a recorder carrying a recording of said first or second class to seize and signal a transcriber station of said third class, and means operated under control of said last seized and signalled transcriber station for causing such recorder to repeat said last recording thereto.

16. Equipment for use in a telephone dictation system, comprising a plurality of dictator stations arranged in classes, a recorder, a plurality of transcriber stations arranged in classes corresponding to said dictator station classes, means controlled from any one of said dictator stations for extending a connection therefrom to said recorder, means operated under control of said dictator station for making a recording on said connected recorder over said connection, means controlled from said dictator station for release of said connection, means operated responsive to said release for causing said recorder to extend a connection to a transcriber station of a particular class, means operated under control of said connected transcriber station for causing said recorder to repeat said recording thereto over said last connection, a first and a second point of access to said recorder from at least one of said dictator stations, means operated under control of such station for extending a connection to said recorder therefrom over either point of access, and means operated responsive to release of such connection for causing said recorder to extend a connection to a transcriber station of either of two classes dependent on the point of access employed.

17. Equipment for use in a telephone dictation system comprising a plurality of dictator stations, a plurality of recorders accessible to all of said dictator stations, a plurality of transcriber stations accessible to all of said recorders, a linefinder associated with each recorder, a common start circuit for said linefinders, means operated responsive to the initiation of a dictation call by any of said dictator stations for extending said start circuit to an idle one of said linefinders to cause said linefinder to extend a connection from said calling station to the associated recorder, means for making a recording on said recorder over said connection, means for releasing said connection, means operated responsive to said release to extend a connection from said recorder to an idle one of said transcriber stations, means for causing said recorder to repeat said recording to said connected transcriber station, means for releasing said last connection, a transfer relay for each linefinder for transferring said start circuit from such linefinder to the next linefinder, means for operating said relay responsive to said extension of said connection from said calling station to said recorder, means for maintaining said transfer relays operated until all of said transfer relays are operated, and means operated responsive to the contemporaneous operation of all of said transfer relays for releasing all transfer relays associated with recorders which have been disconnected from the last connected transcriber station.

18. Equipment as in claim 17, including an all-recorder-busy relay, means for changing the position of said relay after a short time responsive to said contemporaneous operation of all of said transfer relays, in case none of the recorders associated with said operated transfer relays have yet been disconnected from the last connected transcriber station, and means operated responsive to said change of position for causing a busy signal to be given to any dictator station attempting to initiate a dictation call during such time as such change of position is maintained.

19. Equipment as in claim 17, including a manually operable busy key for each linefinder, and means operated responsive to the operation of said busy key for disabling the associated transfer relay, and for transferring said start circuit from the associated linefinder to the next linefinder independently of said transfer relay.

20. Equipment as in claim 17, including an amplifier for each recorder and a power supply circuit therefor, an alarm relay associated with each said amplifier, means for operating said relay responsive to a power failure in the supply circuit of the associated amplifier, and means operated responsive to said relay operation for disabling the associated transfer relay, and for transferring said start circuit from the associated linefinder to the next linefinder independently of said transfer relay.

21. Equipment for use in a telephone dictation system, comprising a plurality of dictator stations, a plurality of recorders accessible to said dictator stations, transcriber stations, means operated under control of any one of said dictator stations for extending a connection therefrom to any one of said recorders, and for making a recording on such recorder over said connection, means operated responsive to the release of said connection by said dictator station for extending a connection from said recorder to one of said transcriber stations, means operated under control of said connected transcriber station for causing said recorder to repeat said recording thereto over said last connection, an amplifier and a power supply circuit therefor for each recorder, an alarm relay associated with each said amplifier, means for operating said relay responsive to a power failure in the supply circuit of the associated amplifier, and means operated responsive to said relay operation for making the associated recorder inaccessible to said dictator stations.

22. Equipment for use in a telephone dictation system, comprising a plurality of tape recorders, a plurality of dictator stations, means operated under control of any one of said dictator stations for extending a connection therefrom to an idle one of said recorders, means controlled from said connected dictator station for starting said recorder and making a recording on the tape thereof over said connection, a tape alarm relay, means for operating said relay responsive to an overrun of said tape while recording, means for operating said relay responsive to a break in said tape while recording, means operated responsive to such operation of said relay for stopping said recorder and giving a particular tone signal to said dictator station, and means operated under control of said connected dictator station upon receipt of said signal for changing the character of said tone signal in case said stoppage is due to a particular one of said two causes of said stoppage.

23. Equipment for use in a telephone dictation system, comprising a plurality of dictator stations, a plurality of tape recorders accessible to said dictator stations, a transcriber station, means operated under control of any one of said dictator stations for extending a connection therefrom to an idle one of said recorders, means controlled from said connected dictator station for starting said recorder and making a recording on the tape thereof over said connection, means for releasing said connection, means operated responsive to such release for rewinding said recorder and extending a connection therefrom to said transcriber station for repeating said recording thereto, a tape alarm relay, means for operating said relay responsive to either an overrun or a breakage of said tape while recording, means operated responsive to said relay operation for stopping said recorder and signalling said dictator station to release said first connection, means operated responsive to such release when said relay is operated due to a broken tape for disabling said recorder and making it inaccessible to said dictator stations, and means operated responsive to such release when said relay is operated due to an overrun for rewinding said recorder and extending a connection therefrom to said transcriber station for repeating said recording thereto.

24. Dictation system equipment as in claim 23, including a source of first and second tone signals, means operated responsive to extension of said first connection to said recorder for signalling said dictator station with said first tone signal, means operated from said dictator station for shifting said recorder to recording position, means operated responsive to said last operation for disconnecting said signal, means operated responsive to operation of said alarm relay for signalling said dictator station with said second tone signal, and means operated responsive to operation of said alarm relay from a broken tape and release of said recorder shifting means from said dictator station in response to said last signal for superimposing said first tone signal on said second tone signal as notice to said dictator station to make another recording on a different recorder.

25. Equipment for use in a telephone dictation system, comprising a plurality of dictator stations, a plurality of tape recorders, a plurality of transcriber stations, means controlled from any one of said dictator stations for extending a connection therefrom to any free one of said recorders and making a recording on the tape thereof over said connection, means operated responsive to the release of said connection by said connected dictator station for extending a connection from said one recorder to a free one of said transcriber stations and for signalling such transcriber station, means operated under control of said signalled transcriber station for causing said recorder to repeat said recording thereto over said last connection, a tape alarm relay, means for operating said relay responsive to an overrun of said tape while repeating, means for operating said relay responsive to a break in said tape while repeating, means operated responsive to such operation of said relay for stopping said recorder and giving a particular tone signal to said transcriber station over said last connection, and means operated under control of said transcriber station for changing the character of said signal only in case said signal is due to a particular one of said two causes of said stoppage.

26. Equipment for use in a telephone dictation system, comprising dictator stations, tape recorders accessible thereto, transcriber stations, means for extending a connection from any one of said dictator stations to any one of said recorders, and for making a recording on the tape thereof over said connection, means operated responsive to the release of said connection for extending a connection from said recorder to one of said transcriber stations, means operated under control of said one transcriber station for causing said recorder to repeat said recording thereto over said last connection, a tape alarm circuit, means for operating said circuit responsive to either an overrun or a breakage of said tape while transcribing, means operated responsive to said circuit operation for stopping said recorder and giving a special signal to said transcriber station over said last connection, means controlled from said transcriber station for releasing said last connection, means operated responsive to such release when said circuit is operated due to a broken tape for disabling said recorder and making it inaccessible to said dictator stations, and means operated responsive to such release when said circuit is operated due to an overrun for rewinding said recorder and making it again accessible to said dictator stations.

27. Equipment for use in a telephone dictation system, comprising dictator stations, tape recorders, transcriber stations, means for extending a connection from any one of said dictator stations to any one of said recorders, and for making a recording on the tape thereof over said connection, means operated responsive to the release of said connection for extending a connection from said recorder to one of said transcriber stations and signalling said transcriber station, means operated under control of said transcriber station for causing said recorder to repeat said recording thereto over said last connection, a tape alarm circuit, means for operating said circuit due to an overrun of said tape while repeating, means for operating said circuit due to a break in said tape while repeating, means operated responsive to said circuit operation for stopping and disabling said recorder and signalling said transcriber, means for rewinding said recorder under control of said transcriber station, and means operated responsive to a partial rewinding of said recorder under such control only when said circuit is operated due to an overrun for reenabling said recorder so as to place it again under full control of said transcriber station.

28. Equipment for use in a telephone dictation system, comprising dictator stations, recorders, transcriber stations, means for extending a connection from any one of said dictator stations to any one of said recorders, means for making a recording on said recorder over said connection, means operated responsive to the release of said connection for extending a connection from said recorder to one of said transcriber stations, means operated under control of said connected transcriber station for causing said recorder to repeat said recording thereto, an amplifier for each transcriber station and a power supply circuit therefor, an alarm relay associated with each said amplifier, means for operating said alarm relay responsive to a power failure in the supply circuit of the associated amplifier, and means operated responsive to said relay operation for disabling the associated transcriber station and for causing all connections from said recorders directed toward said transcriber station to be extended to a different transcriber station.

29. Equipment for use in a telephone dictation system, comprising dictator stations of different classes, transcriber stations of corresponding classes, recorders, means for extending a connection from any one of said dictator stations to any recorder, means for making a recording on said recorder over said connection, means operated responsive to the release of said connection for extending a connection from said recorder to a transcribing station corresponding in class to said dictator station, means for causing said recorder to repeat said recording over said last connection, an amplifier and a power supply circuit therefor for each transcriber station, an alarm relay for each transcriber station, means for operating said relay responsive to a power failure in the supply circuit of the associated amplifier, and means operated responsive to said relay operation for disabling the associated transcriber station, and for causing recorders carrying recordings of the corresponding class to be connected to the other transcriber stations of this class.

30. Telephone dictation system equipment as in claim 28, including means operated responsive to the contemporaneous operation of the amplifier alarm relays for all of the transcriber stations of a given class for causing recorders carrying recordings of this class to be connected to a transcribing station of a different class.

No references cited.